United States Patent [19]
Mase et al.

[11] Patent Number: 6,026,468
[45] Date of Patent: Feb. 15, 2000

[54] METHOD OF CONTROLLING MAGNETIC TAPE UNIT

[75] Inventors: Tomonori Mase; Katsuo Enohara; Osamu Shimura, all of Yokohama, Japan

[73] Assignee: Fujitsu Limited, Kawasaki, Japan

[21] Appl. No.: 09/013,050

[22] Filed: Jan. 26, 1998

[30]     Foreign Application Priority Data

Aug. 18, 1997 [JP] Japan .................................. 9-221408

[51] Int. Cl.⁷ .................................................. G06F 13/14
[52] U.S. Cl. .............................. 711/111; 711/154; 711/4
[58] Field of Search ............................. 360/74.1; 711/4, 711/111, 154; 710/52

[56]         References Cited

U.S. PATENT DOCUMENTS

| | | | |
|---|---|---|---|
| 5,420,983 | 5/1995 | Noya et al. ................................ | 710/30 |
| 5,630,092 | 5/1997 | Carreiro et al. .......................... | 711/111 |
| 5,671,389 | 9/1997 | Saliba ....................................... | 711/111 |
| 5,724,541 | 3/1998 | Tsukamoto et al. ...................... | 711/111 |
| 5,829,046 | 10/1998 | Tzelnic ..................................... | 711/162 |
| 5,845,316 | 12/1998 | Hillyer et al. ............................. | 711/111 |
| 5,911,148 | 6/1999 | Anglin et al. ............................. | 711/111 |

FOREIGN PATENT DOCUMENTS

| | | |
|---|---|---|
| 61-112244 | 5/1986 | Japan . |
| 62-097020 | 5/1987 | Japan . |
| 4-128917 | 4/1992 | Japan . |
| 4-149866 | 5/1992 | Japan . |
| 4-248613 | 9/1992 | Japan . |
| 4-325923 | 11/1992 | Japan . |

Primary Examiner—John W. Cabeca
Assistant Examiner—Christopher S. Chow
Attorney, Agent, or Firm—Staas & Halsey LLP

[57]              ABSTRACT

The present invention is made such that data in a buffer can be transferred even when read back commands are continuously issued so as to completely eliminate the need for a mechanical operation required for each data block in ROR processing, resulting in considerably reducing a processing time. For this purpose, a method of controlling a magnetic tape unit of the present invention includes the steps of, when the read back command is received from a host processor, reading plurality of data blocks, when a read position of an MTU meets a predetermined condition, reading in a forward direction a plurality of data blocks in the range between the position and a start position of the read back command so as to write the data blocks into the data buffer, storing read commands concerning the data blocks into a command queue in reverse order to how the data blocks are read, and thereafter, in response to a read command from the host processor, reading the data blocks in the data buffer in the order in which the read commands are arranged in the command queue so as to transfer the data blocks to the host processor after data expansion. Further, the invention is applied to a magnetic tape unit to write data compressed through, for example, an EDRC system onto a magnetic tape, and read the compressed data therefrom.

13 Claims, 32 Drawing Sheets

- DETECTION OF FULL OF DATA BUFFER
- DETECTION OF SECTOR INTERRUPTION
- DETECTION OF LIMIT OF COMMAND BUFFER

FIG. 26

| | | PRIOR-ART OPERATION | | | OPERATION OF THE EMBODIMENT | | |
|---|---|---|---|---|---|---|---|
| | COMMAND | TM / EOF1 EOF2 | TURNAROUND TIME ms | | TM / EOF1 EOF2 | TURNAROUND TIME ms | REMARKS |
| 1 | RB | ← 1 | 279.1 | | → 1 | 537.1 | UCK |
| 2 | SNS | ← 1 | 3.4 | | | 3.4 | ERP26 |
| 3 | RD | → 3 | 445.1 | | 3 | 3.2 | EOF 2 |
| 4 | BSP | ← 4 | 473.5 | | 4 | 7.2 | |
| 5 | RB | ← 5 | 314.5 | | 5 | 10.1 | UCK |
| 6 | SNS | | 3.4 | | | 3.4 | ERP26 |
| 7 | RD | → 7 | 135.6 | | 7 | 3.1 | EOF 1 |
| 8 | BSP | ← 8 | 478.0 | | 8 | 7.4 | |
| 9 | RB | ← 9 | 100.0 | | ← 9 | 196.1 | TM |
| 10 | RD | → 10 | 152.6 | → 10 | | 148.5 | TM |
| 11 | RD | → 11 | 99.9 | | → 11 | 103.9 | EOF 1 |
| 12 | RD | 12 | 3.1 | | 12 | 3.2 | EOF 2 |
| 13 | RB | ← 13 | 481.5 | | 13 | 9.5 | UCK |
| 14 | SNS | | 3.4 | | | 3.4 | ERP26 |
| 15 | RD | → 15 | 441.8 | | 15 | 3.2 | EOF 2 |
| 16 | BSP | ← 16 | 476.8 | | 16 | 7.4 | |
| 17 | RB | ← 17 | 315.5 | | 17 | 9.9 | UCK |
| 18 | SNS | | 3.4 | | | 3.4 | ERP26 |
| 19 | RD | → 19 | 135.6 | | 19 | 3.0 | EOF 1 |
| 20 | BSP | ← 20 | 446.3 | | 20 | 7.3 | |
| 21 | RB | ← 21 | 107.9 | ← 21 | | 505.7 | TM |
| | | | 4900.4 | | | 1579.4 | |

METHOD OF CONTROLLING MAGNETIC TAPE UNIT

BACKGROUND OF THE INVENTION

1) Field of the Invention

The present invention relates to a technique applied to a magnetic tape unit to write on a magnetic tape (storage medium) data compressed through, for example, an EDRC (Enhanced Data Recording Capability) system, and read the compressed data. More particularly, the invention relates to a method of controlling a magnetic tape unit, for performing ROR (Read Opposite Retry) processing required after read back of the compressed data.

2) Description of the Related Art

In recent years, more efficient backup/restore operations in which data is copied between a DASD (Direct Access Storage Device) and a magnetic tape have been desired for a requirement for a higher speed computer system. Therefore, an EDRC compression mechanism is used to compress data, and the compressed data is recorded on the magnetic tape, thereby recording massive amounts of data on the magnetic tape.

In general, when the data compressed through the EDRC system is read from the magnetic tape, it is possible to expand the compressed data read by the magnetic tape unit from the magnetic tape in a forward direction (a normal reading direction). However, it is impossible to expand the compressed data read in a backward direction in response to a read back command. Hence, when a host computer issues the read back command to read the compressed data in the backward direction, it is necessary to carry out ROR processing in which the compressed data is read in the forward direction once again.

FIG. 27 is a block diagram showing a hardware configuration of a typical magnetic tape controller. As shown in FIG. 27, a magnetic tape controller (MTC) 10 is installed between a CPU (host computer, host processor) 20 and a magnetic tape unit (MTU) 30. The MTC 10 controls the operation of the MTU 30 in response to a command from the CPU 20.

Further, the MTC 10 includes a channel interface circuit 11, a data compressing circuit 12, a data expanding circuit 13, a host interface controller (HIC) 14, a format controller (FMT) 15, a command buffer 16, and a data buffer 17.

Here, the channel interface circuit 11 controls a channel interface with the CPU 20, the data compressing circuit 12 performs data compression through, for example, the EDRC system, and the data expanding circuit 13 expands the compressed data.

Additionally, the HIC 14 makes a format conversion and a format control for transmission and reception of data between the CPU 20 and the MTC 10. The FMT 15 makes a format conversion and a format control for transmission and reception of data between the MTU 30 and the MTC 10.

The command buffer 16 establishes communication between the HIC 14 and the FMT 15. According to an instruction from the CPU 20, commands to instruct, for example, the operations which should be performed by the HIC 14 and the FMT 15 are stored in the command buffer 16. Data (write data) to be written on the magnetic tape (storage medium) or data (read data) read from the magnetic tape is temporarily stored in the data buffer 17 in blocks.

Further, as shown in FIG. 28, the command buffer 16 includes an HIC command pointer table (HQP) 16-1, an HIC command list table (HQL) 16-2, an FMT command pointer table (FQP) 16-3, and an FMT command list table (FQL) 16-4.

In the HQP 16-1, a prefetch instruction flag is set to cause the FMT 15 to previously perform a reading and a read back, a command pointer is set to indicate a position of the latest command in the HQL 16-2, and a block ID pointer is set to indicate an ID (IDentification) of the latest block in the data buffer 17.

The HQL 16-2 serves as a command queue in which commands to instruct the operation to be performed by the HIC 14 are stored in the order in which the commands are generated in response to the instruction from the CPU 20. The HQL 16-2 holds, for example, a pointer indicating a position on the data buffer 17, of a data block corresponding to each command.

In the FQP 16-3, a prefetch completion flag is set to show that the reading and the read back are previously performed, and the previous operations are completed, a command pointer is set to indicate a position of the latest command in the FQL 16-4, and a block ID pointer is set to indicate an ID of the latest block in the data buffer 17.

The FQL 16-4 serves as a command queue in which commands to instruct the operation to be performed by the FMT 15 are stored in the order in which the commands are generated in response to the instruction from the CPU 20. The FQL 16-4 holds, for example, a pointer indicating a position on the data buffer 17, of a data block corresponding to each command.

Next, a description will be given of the operation of the MTC 10 having the above configuration.

Write Sequence

First, referring to FIG. 28, a description will be given of a case where, under control of the MTC 10, the MTU 30 is operated in response to the instruction from the CPU 20 to record predetermined data (data blocks "DATA 1," "DATA 2," and "DATA 3") on the magnetic tape. Moreover, in FIG. 28, at a time of writing, the prefetch instruction flag is not set in the HQP 16-1, and the prefetch completion flag is not set in the FQP 16-3.

In the MTC 10, when a write command issued from the CPU 20 is received through the channel interface circuit 11, write commands (WRITE 1, WRITE 2, and WRITE 3) are sequentially stored in the HQL 16-2 according to the command pointer of the HQP 16-1. Further, for each of the write commands, the data blocks "DATA 1," "DATA 2," and "DATA 3" to be recorded on the magnetic tape are sequentially written in the data buffer 17. Moreover, when the data to be written on the magnetic tape is written on the magnetic tape under compression, the data is temporarily input into the data compressing circuit 12 through the channel interface circuit 11, and is written into the data buffer 17 after the compression by the data compressing circuit 12 through the EDRC system.

Further, the FMT 15 compares a value of the command pointer of the HQP 16-1 with a value of the command pointer of the FQP 16-3 to sequentially transfer the data blocks corresponding to differences therebetween to the MTU 30, resulting in recording the data blocks onto the magnetic tape. At the time, as shown in FIG. 28, the FQP 16-3 and the FQL 16-4 are sequentially updated. That is, every time the data block in the data buffer 17 is transferred to the MTU 30 to be recorded on the magnetic tape, a command which has been executed is recorded on the FQL 16-4, and an ID of the latest data block which has been written is recorded thereon according to the command pointer of the FQP 16-3.

Moreover, FIG. 28 shows a state in which the first data block "DATA 1" has been written on the magnetic tape. In the state shown in FIG. 28, the block ID pointer of the HQP 16-1 denotes an ID (for example, "3") of the third data block, and the block ID pointer of the FQP 16-3 denotes an ID (for example, "1") of the first data block.

Read Sequence

In the MTC 10, when a read command issued from the CPU 20 is received through the channel interface circuit 11, the HIC 14 sets the prefetch instruction flag in the HQP 16-1. Further, the FMT 15 sees the prefetch instruction flag set in the HQP 16-1 to cause the MTU 30 to read the plurality of data blocks from the magnetic tape, and write the data blocks into the data buffer 17.

At the time, as shown by the arrow in FIG. 29, the MTU 30 is mechanically operated such that a head of the MTU 30 is moved in a forward direction relative to the magnetic tape MT, thereby sequentially reading the data blocks "DATA 1," "DATA 2," and "DATA 3." Though the three data blocks are illustratively written into the data buffer 17, the number of data blocks to be prefetched can be set according to, for example, a capacity of the data buffer 17. A control may be made to stop the prefetch when an amount of written data exceeds the capacity of the data buffer 17.

Further, as shown in FIG. 30, the commands "READ 1," "READ 2," and "READ 3" corresponding to the data blocks written in the data buffer 17 are sequentially set in the command queue of the FQL 16-4 according to the command pointer of the FQP 16-3.

In such a manner, a predetermined number of (three in the discussion) data blocks are written into the data buffer 17, thereafter storing the latest command pointer and the latest block ID in the FQP 16-3, and setting the prefetch completion flag therein.

After the prefetch completion flag is set in the FQP 16-3, the HIC 14 compares a value of the command pointer of the HQP 16-1 with a value of the command pointer of the FQP 16-3 to sequentially transfer the data blocks corresponding to differences therebetween to the CPU 20. At the time, as shown in FIG. 31, the HQP 16-1 and the HQL 16-2 are sequentially updated. That is, every time the data block in the data buffer 17 is transferred to the CPU 20, a command which has been executed is recorded in the HQL 16-2, and an ID of the latest data block which has been transferred is recorded therein according to the command pointer of the HQP 16-1.

Moreover, FIG. 31 shows a state in which all the three data blocks have been transferred to (read into) the CPU 20. In the state shown in FIG. 31, both the block ID pointer of the HQP 16-1 and the block ID pointer of the FQP 16-3 denote the ID (for example, "3") of the third data block.

Further, at a time of data transfer to the CPU 20, the data read from the magnetic tape may be under compression. In such a case, the data is temporarily input into the data expanding circuit 13 to be expanded, and is thereafter transferred to the CPU 20.

After the prefetch as stated above, in response to the read commands continuously issued from the CPU 20, the MTC 10 can send the read data to a channel for transfer to the CPU 20 as long as any read data is present in the data buffer 17 without the mechanical operation (actual reading) of the MTU 30. Therefore, it is possible to eliminate the need for the mechanical operation of the MTU 30 for each data block, resulting in enhanced efficiency of data transfer at a time of reading.

Read Back Sequence

In the MTC 10, when the read back command issued from the CPU 20 is received through the channel interface circuit 11, the HIC 14 sets the prefetch instruction flag in the HQP 16-1. Further, the FMT 15 sees the prefetch instruction flag set in the HQP 16-1 to cause the MTU 30 to read one data block from the magnetic tape, and write the data block in the data buffer 17.

At the time, as shown by the arrow in FIG. 32, the MTU 30 is mechanically operated such that the head of the MTU 30 is moved by one data block in the reverse direction (backward direction) relative to the magnetic tape MT, thereby reading the one data block. Thus, as illustratively shown in FIG. 33, a data block "aabbcc . . . xxyyzz" written in the forward direction at the time of writing is written into the data buffer 17 as "zzyyxx . . . ccbbaa" by the read back.

Further, as shown in FIG. 33, a command "READBACK" corresponding to the data block written in the data buffer 17 is set in the command queue of the FQL 16-4 according to a command pointer of the FQP 16-3.

In such a manner, the one read back data block is written into the data buffer 17. Thereafter, the latest command pointer and the latest block ID are stored in the FQP 16-3, and the prefetch completion flag is set therein.

Meanwhile, even when the CPU 20 issues the read back command, the MTC 10 has to send forward data to a channel so as to transfer the data to the CPU 20. As stated above, it is generally impossible to expand the data compressed through the EDRC system with the data arranged in the backward direction.

Hence, in the prior art, the ROR processing is performed between the channel and the MTC 10.

That is, when the CPU 20 issues the read back command, and the prefetch completion flag is set in the FQP 16-3 as described above, the MTC 10 sends back to the CPU 20 as a UCK (Unit ChecK) a retry request for a read command shown by ERP (Error Recovery Procedure)=26. In response thereto, the CPU 20 issues the read command.

The MTC 10 receives the read command from the CPU 20 to carry out the above read sequence. That is, in the MTC 10, when the read command issued from the CPU 20 is received through the channel interface circuit 11, the HIC 14 sets the prefetch instruction flag in the HQP 16-1. Further, the FMT 15 sees the prefetch instruction flag set in the HQP 16-1 to cause the MTU 30 to read one data block from the magnetic tape, and write the data block into the data buffer 17.

At the time, as shown by the arrow in FIG. 34, the MTU 30 is mechanically operated such that the head of the MTU 30 is moved by one data block in a forward direction relative to the magnetic tape MT, thereby reading the previously read back data block in the forward direction. After the reading, the data is stored in the data buffer 17 with the contents arranged in the forward direction as shown in FIG. 35.

Further, as shown in FIG. 35, a command "READ" corresponding to the data block written into the data buffer 17 overwrites the previous command "READBACK" in the command queue of the FQL 16-4 according to the command pointer of the FQP 16-3. Thereafter, the latest command pointer and the latest block ID are stored in the FQP 16-3, and the prefetch completion flag is set therein.

After the prefetch completion flag is set in the FQP 16-3, the HIC 14 compares a value of the command pointer of the HQP 16-1 with a value of the command pointer of the FQP 16-3 to transfer one data block corresponding to a difference therebetween to the CPU 20. At the time, as shown in FIG. 36, the HQP 16-1 and the HQL 16-2 are updated to record the command "READ" which has been executed into the HQL 16-2. Moreover, in a state shown in FIG. 36, block ID pointers of the HQP 16-1 and the FQP 16-3 denote an ID (for example, "2") of the second data block.

Further, at the time of data transfer to the CPU 20, the compressed forward data read from the magnetic tape is temporarily input into the data expanding circuit 13. The data is expanded and is subsequently transferred to the CPU 20.

Thereafter, the CPU 20 issues a backspace command. The MTU 30 mechanically operates under control of the FMT 15 such that the head of the MTU 30 can be positioned at a position the front of the block (the left-hand side in FIG. 37) after the completion of a back read operation as shown by the arrow in FIG. 37.

When the CPU (host computer) 20 issues the read back command to the magnetic tape on which the EDRC compressed data is recorded, in the MTC 10, conventionally, the ROR processing described with reference to FIGS. 34 to 37 is performed to transfer a target data block to the CPU 20 after the expansion in the data expanding circuit 13.

FIG. 38 shows all relative movements (mechanical operations) of the head of the MTU 30 with respect to the magnetic tape MT for a period from the issue of the read back command to the completion of the ROR processing.

As shown in FIG. 38, a first mechanical operation (see the upper arrow in FIG. 38) is performed in a backward direction in response to the read back command (READ BACK). Subsequently, a second mechanical operation (see the middle arrow in FIG. 38) is performed in a forward direction in response to the read command (READ). Finally, a third mechanical operation (see the lower arrow in FIG. 38) is performed in a backward direction in response to the backspace command (BACK SPACE). That is, in order to read only the one data block, it is necessary to carry out the processing with the mechanical operations (the operations of the MTU 30) in response to all the back read, read, and backspace commands.

When a job is executed to continuously issue the read back commands, it is impossible to continuously transfer the plurality of data blocks unlike the reading and the writing. Consequently, the ROR processing must be performed for each data block, resulting in a considerably long processing time.

For example, in order to read back data blocks D, C, B, and A in this order as shown in FIG. 39, for each of the data blocks D, C, B, and A, the MTU 30 has to perform the mechanical operations corresponding to the back read command (RB), the read command (RD), and the backspace command (BSP) as in the case of FIG. 38. Hence, the MTU 30 must separately perform the piecemeal mechanical operation for each data block, thereby requiring a significant long processing time.

A description will now be given of an illustrative job to continuously issue the read back commands. For example, when a database is updated, modified data is recorded onto a backup magnetic tape as transaction log data. The transaction log data recorded on the magnetic tape is not used in a normal operating state.

However, if any error occurs in the database, a system recovers the database by using the transaction log data. The system continuously issues the read back commands to read the transaction log data in a backward direction from the latest transaction log data (that is, the last data block on the magnetic tape), and compares the transaction log data with data on the database for recovery.

In this case, since the ROR processing is performed for each of the data blocks as shown in FIG. 39, a long time is required to read the data in the backward direction from the magnetic tape. Therefore, a failure occurring in the database results in vast amounts of time required for the recovery operation, which may become a critical problem for system users.

As described above, it is generally impossible to directly expand in the data expanding circuit 13 the EDRC compressed data read in the backward direction. In order to realize the expansion of the compressed data in hardware, it is necessary to mount a circuit to reverse the backward data between the data expanding circuit 13 and the data buffer 17, resulting in a more costly and heavier hardware. Hence, it has been desired to enhance performance of the ROR processing by firmware.

SUMMARY OF THE INVENTION

In view of the foregoing problems, it is an object of the present invention to provide a method of controlling a magnetic tape unit, in which a data in a data buffer can be transferred even when read back commands are continuously issued as in the case of continuous processing of read commands or write commands, thereby eliminating the need for a mechanical operation required for each data block in ROR processing, resulting in a considerably reduced processing time.

According to the present invention, for achieving the above-mentioned object, there is provided a method of controlling a magnetic tape unit, in which an operation of the magnetic tape unit is controlled in response to a command from a host processor, while temporarily storing in a data buffer a data block to be written onto a magnetic tape by the magnetic tape unit and a data block read from the magnetic tape by the magnetic tape unit, and storing into a command queue commands concerning the data blocks in the data buffer in the order in which the commands are executed. The method includes the steps of, when a read back command to compressed data recorded on the magnetic tape is received from the host processor, causing the magnetic tape unit to read a plurality of data blocks in a backward direction from the magnetic tape, when a read position of the magnetic tape unit reaches a position at which a predetermined condition is met, causing the magnetic tape unit to read in a forward direction from the magnetic tape the plurality of data blocks in the range between the position and a start position of the read back command so as to write the plurality of data blocks read in the forward direction into the data buffer, storing read commands concerning the data blocks read in the forward direction into the command queue in reverse order to how the data blocks are read by the magnetic tape unit, and thereafter sequentially reading, in response to a read command from the host processor, the data blocks in the data buffer according to the read commands in the command queue so as to transfer the data blocks to the host processor after data expansion.

As stated above, according to the method of controlling the magnetic tape unit of the present invention, when the first read back command is issued, the backward reading is continuously performed, and the process wraps around in the forward direction from the position at which the predetermined condition is met so as to continuously perform the reading.

Further, at the same time when the plurality of data blocks read in the forward direction are written into the data buffer, the read commands concerning the data blocks read in the forward direction are stored in the command queue in reverse order to how the data blocks are read. It is thereby possible to continuously transfer the data blocks in the data buffer to the host processor even when the read back commands are continuously issued as in the case of the continuous processing of the read commands or the write commands.

This completely eliminates the need for the mechanical operation of the magnetic tape unit, required for each data block in ROR processing, resulting in a considerably reduced processing time. Thus, without increasing a cost and weight of hardware, it is possible to remarkably enhance performance of the ROR processing, that is, performance of the magnetic tape controller only by modifying firmware.

BRIEF DESCRIPTION OF THE DRAWINGS

FIG. 26 is a diagram for explaining a specific operation of the magnetic tape controller to which the method of the embodiment is applied while making a comparison with an operation of a magnetic tape controller to which a conventional method is applied;

DESCRIPTION OF THE PREFERRED EMBODIMENTS

[A] Description of Aspect of the Invention

Figure 1:
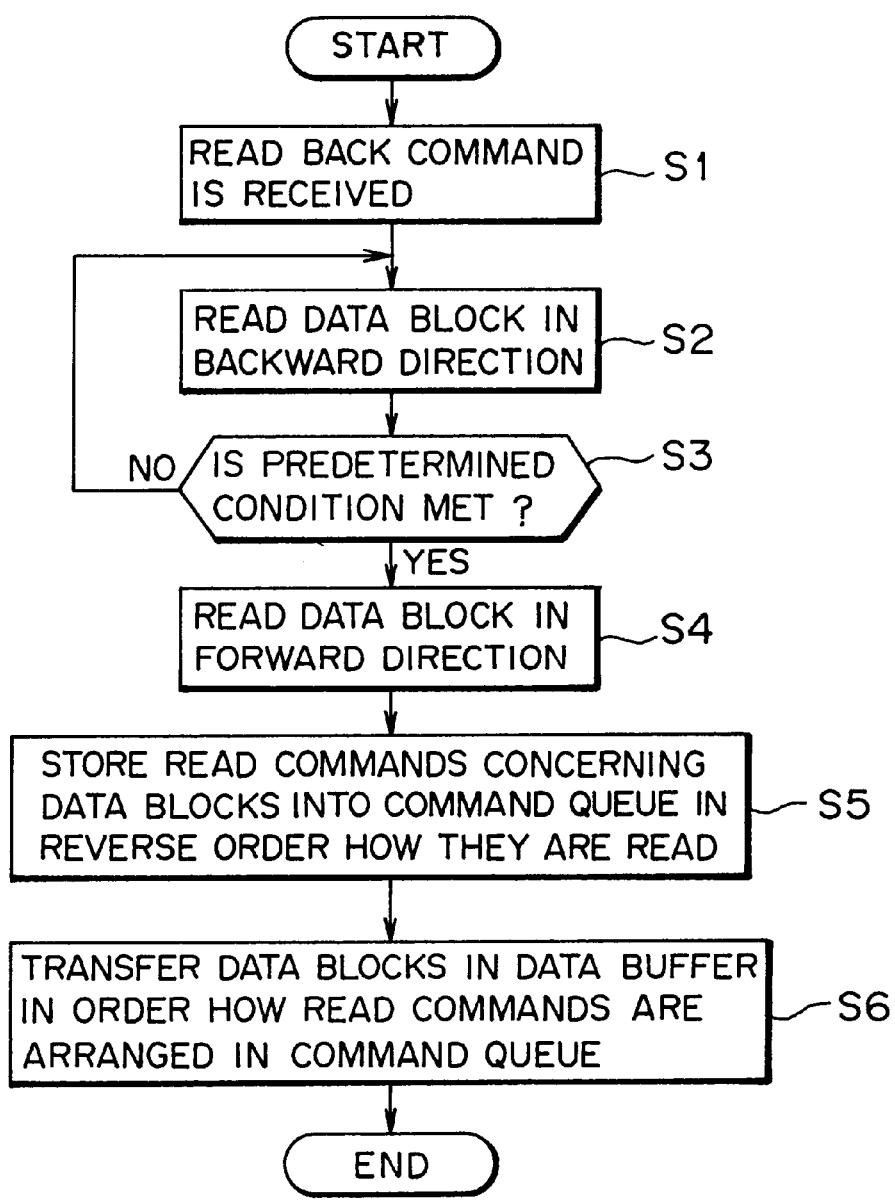
FIG. 1 is a diagram for explaining an aspect of the present invention.

As shown in FIG. 1, in a method of controlling a magnetic tape unit according to the present invention, a magnetic tape unit is controlled in response to a command from a host processor, while temporarily storing into a data buffer a data block to be written onto a magnetic tape by the magnetic tape unit and a data block read from the magnetic tape by the magnetic tape unit, and storing into a command queue commands concerning the data blocks in the data buffer in the order in which the commands are executed.

Further, according to the present invention, as shown in FIG. 1, when a read back command to compressed data recorded on the magnetic tape is received from the host processor (Step S1), the magnetic tape unit is caused to read a plurality of data blocks in a backward direction from the magnetic tape (Step S2).

When a read position of the magnetic tape unit reaches a position at which a predetermined condition is met (in the case of YES in Step S3), the magnetic tape unit is caused to read in a forward direction from the magnetic tape the plurality of data blocks in the range between the position and a start position of the read back command. The plurality of data blocks read in the forward direction are written into the data buffer (Step S4). At the time, read commands concerning the data blocks read in the forward direction are stored into the command queue in reverse order to how the data blocks are read by the magnetic tape unit (Step S5).

Thereafter, in response to a read command from the host processor, the data blocks in the data buffer are sequentially read according to the read commands in the command queue, and are transferred to the host processor after data expansion (Step S6).

Moreover, when, in response to the read command from the host processor, the compressed data recorded on the magnetic tape is read by the magnetic tape unit in the forward direction to be written into the data buffer, and subsequently the read back command to the compressed data is received from the host processor, the data block in the data buffer is read to be transferred to the host processor after data expansion.

Further, according to the present invention, the following conditions (1) to (9) can be defined as predetermined conditions (criteria in Step S3 of FIG. 1) for switching from a backward reading to a forward reading:

(1) Detection of a tape mark recorded on a magnetic tape to identify a file boundary;

(2) Detection of an erase mark recorded on the magnetic tape to erase a data block;

(3) Detection of a format change record mark recorded on the magnetic tape to identify a format change boundary;

(4) Detection of a wrap mark recorded on the magnetic tape to indicate a returning position at a time of double density recording;

(5) Detection of a mark recorded on the magnetic tape to indicate a head of the magnetic tape;

(6) Detection of a full state of a data buffer;

(7) Detection of a sector interruption from a magnetic tape unit side;

(8) Detection of a limit of a command queue; and (9) Detection of a data check signal to an unreadable data block.

In addition, when a data check signal to an unreadable data block is detected before the completion of the forward reading of the plurality of data blocks in the range between the position at which the predetermined condition is met and the start position of the read back command, a data block read on the side of the start position of the read back command with respect to the unreadable data block is transferred to the host processor.

In this case, if the unreadable data block is a data block at the start position of the read back command, all the data blocks read in the forward direction from the position at which the predetermined condition is met are nullified.

As stated above, according to the method of controlling the magnetic tape unit of the present invention, when a first read back command is issued, the backward reading is continuously performed, and the process returns in the forward direction from the position at which the predetermined condition is met so as to continuously perform the reading.

Further, at the same time when the plurality of data blocks read in the forward direction are written in the data buffer, the read commands concerning the data blocks read in the forward direction are stored in the command queue in reverse order to how the data blocks are read. It is thereby possible to continuously transfer the data blocks in the data buffer to the host processor even when the read back commands are continuously issued as in the case of continuous processing of the read commands and the write commands.

This completely eliminates the need for a mechanical operation of the magnetic tape unit, required for each data block in ROR processing, resulting in a considerably reduced processing time. Thus, without increasing a cost and weight of hardware, it is possible to remarkably enhance performance of the ROR processing, that is, performance of a magnetic tape controller only by modifying firmware.

[B] Description of One Embodiment of the Invention

A description will now be given of an embodiment of the present invention referring to the accompanying drawings.

Figure 27:
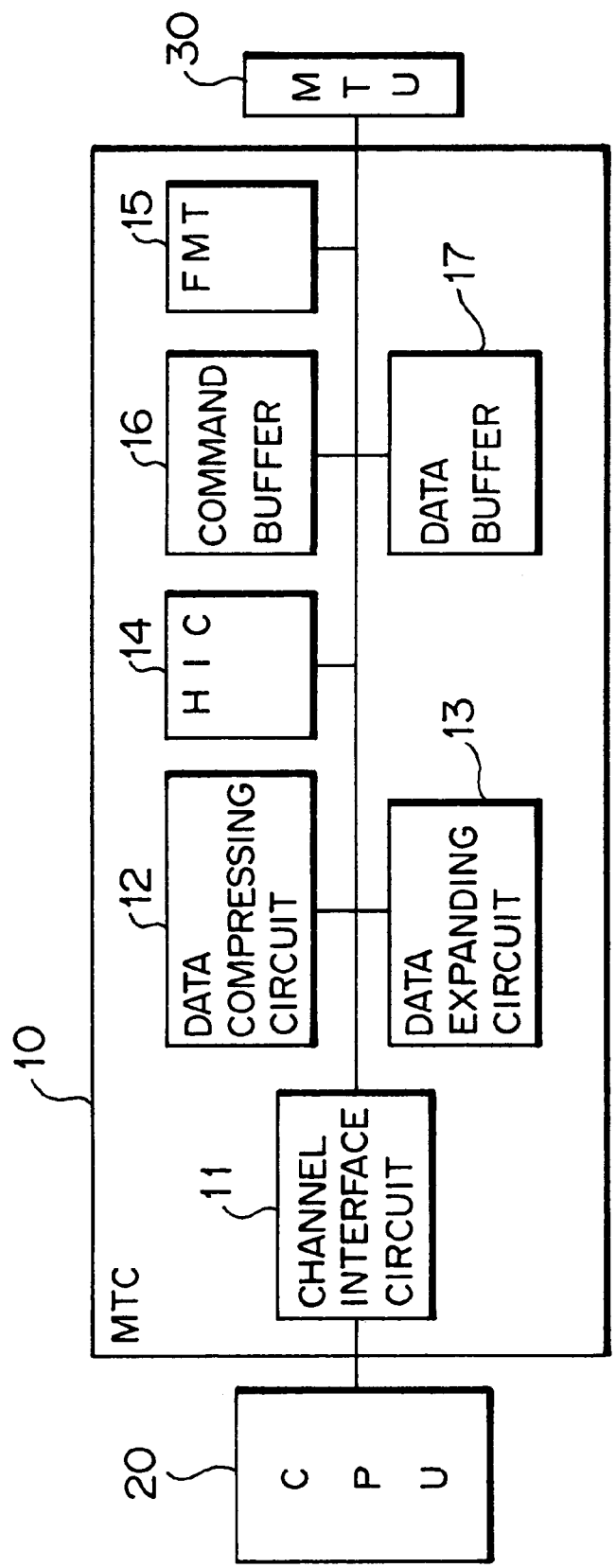
FIG. 27 is a block diagram showing a hardware configuration of a typical magnetic tape controller (magnetic tape controller to which the method of the embodiment is applied)
Figure 28:
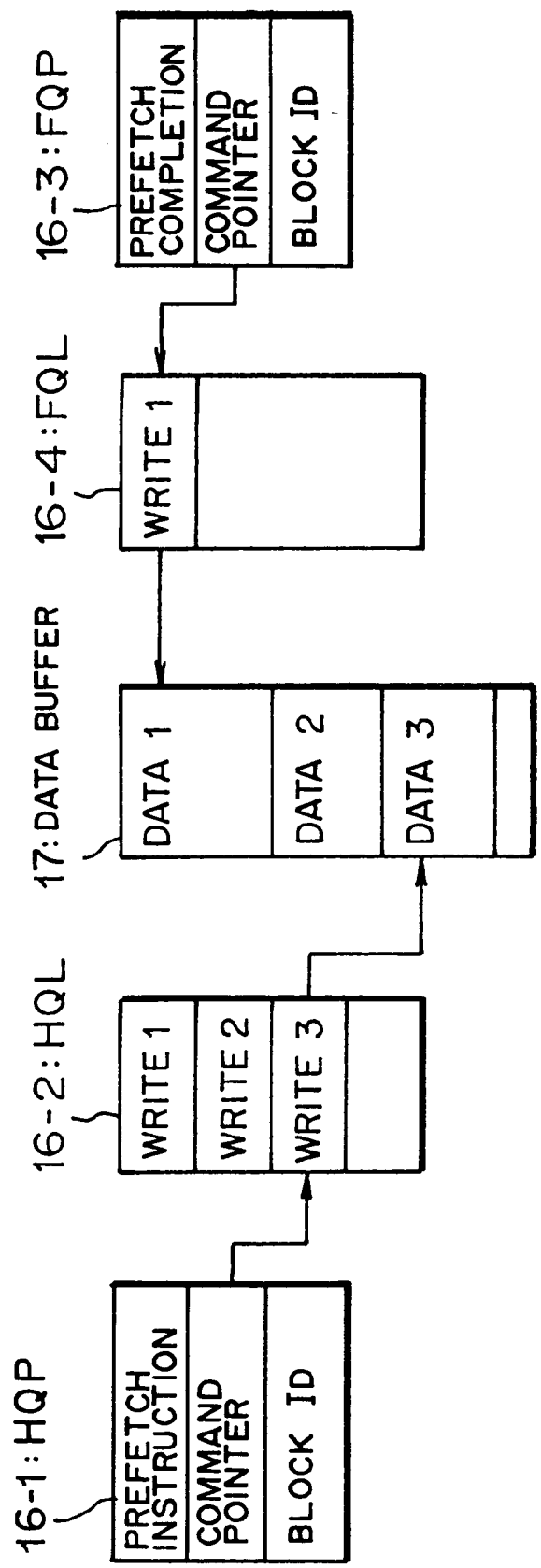
FIG. 28 is a diagram showing a configuration of a command buffer, and showing states of a data buffer and the command buffer at a time of writing.

A magnetic tape controller to which a method of controlling a magnetic tape unit of the present invention is applied has the same hardware configuration as that of the magnetic tape controller (see reference numeral 10) discussed above with reference to FIGS. 27 and 28, and a description thereof is omitted. In the following discussion, the same reference numerals are used for component parts identical or equivalent to those illustrated in FIGS. 27 and 28.

In the embodiment, neither a CPU (host computer, host processor) 20 nor an MTU (magnetic tape unit) 30 is varied in both hardware and software. However, only a change in firmware is made to an MTC (magnetic tape controller) 10.

A description will now be given of the method of controlling the magnetic tape unit according to the embodiment of the present invention referring to FIGS. 1 to 26.

Writing is continuously performed according to the procedure described before referring to FIG. 28. Thereafter, in the MTC 10, when a read back command issued from the CPU 20 is received through a channel interface circuit 11 (see Step S1 in FIG. 1), an HIC 14 sets a prefetch instruction flag in an HQP 16-1. Further, an FMT 15 sees the prefetch instruction flag set in the HQP 16-1 to cause the MTU 30 to read a plurality of data blocks from the magnetic tape in a backward direction, and write the data blocks in a data buffer 17 (see Step S2 in FIG. 1).

Further, when a position of the magnetic tape read by the MTU 30 reaches a position at which predetermined conditions described infra referring to FIGS. 14 to 20 are met (in the case of YES in Step S3 of FIG. 1), the backward reading of the MTU 30 is stopped.

Figure 2:
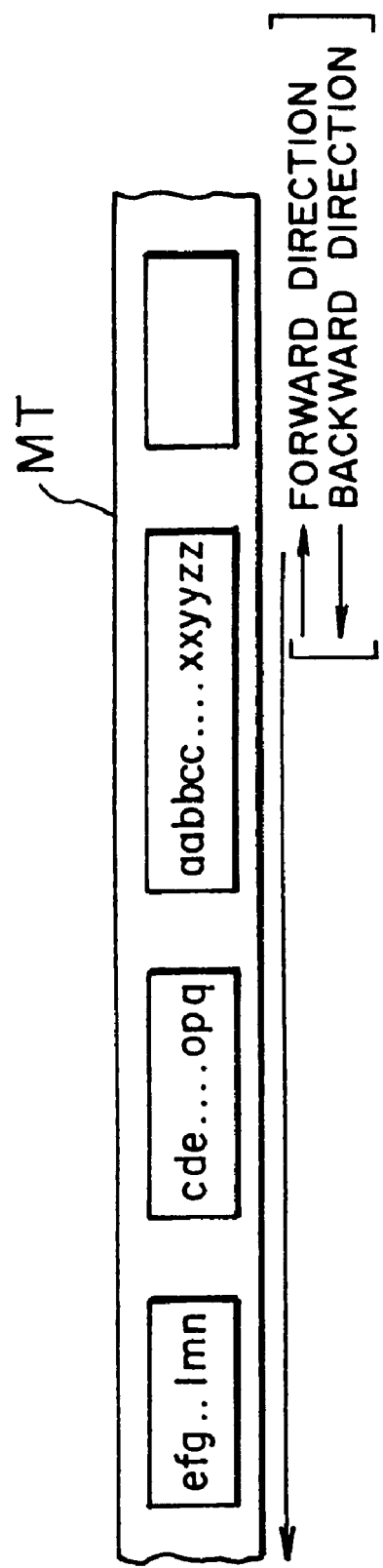
FIG. 2 is a diagram for explaining a mechanical operation (backward reading) of a magnetic tape unit when a read back command is received after writing in a method of controlling the magnetic tape unit according to one embodiment of the present invention.
Figure 3:
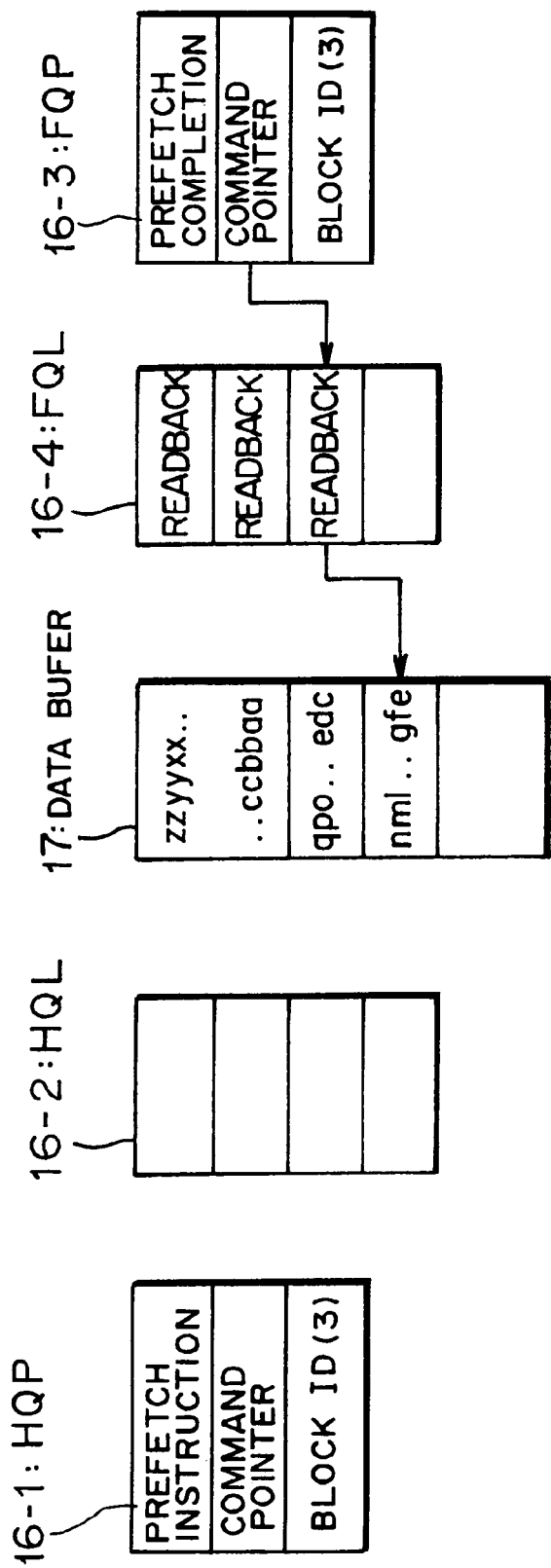
FIG. 3 is a diagram showing data and commands respectively read in a data buffer and a command buffer by the backward reading in the method of controlling the magnetic tape unit according to the embodiment of the present invention.

At the time, as shown by the arrow in FIG. 2, the MTU 30 is mechanically operated such that a head of the MTU 30 is moved by the plurality of data blocks in a reverse direction (backward direction) relative to the magnetic tape MT, thereby reading, for example, three data blocks. Thus, as shown in FIG. 3, the three data blocks "aabbcc . . . xxyyzz," "cde . . . opq," and "efg . . . lmn" written in the forward direction at the time of writing are respectively written in the data buffer 17 as "zzyyxx . . . ccbbaa," "qpo . . . edc," and "nml . . . gfe" by the backward reading. Moreover, it will be appreciated that the data blocks to be read are compressed through an EDRC system.

Further, as shown in FIG. 3, a command "READBACK" corresponding to each of the data blocks written into the data buffer 17 is set in a command queue of an FQL 16-4 according to a command pointer of an FQP 16-3.

After the three read back data blocks are written into the data buffer 17 in such a manner, the latest command pointer and the latest block ID (for example, "3") are stored in the FQP 16-3. However, in the embodiment, a prefetch completion flag is not yet set.

In a state shown in FIG. 3, since data are arranged in the reverse order in the data blocks written into the data buffer 17, the data cannot be expanded by a data expanding circuit 13 as described above. Hence, the data blocks are left unused.

When the position of the magnetic tape read by the MTU 30 reaches the position at which the predetermined conditions are met (in the case of a decision of YES in Step S3 of FIG. 1), the FMT 15 switches a reading direction of the MTU 30 over from the backward direction to the forward direction. The FMT 15 causes the MTU 30 to read in the forward direction the plurality of (three) data blocks read in the backward direction, thereby writing the data blocks in the data buffer 17 (see Step S4 in FIG. 1).

Figure 4:
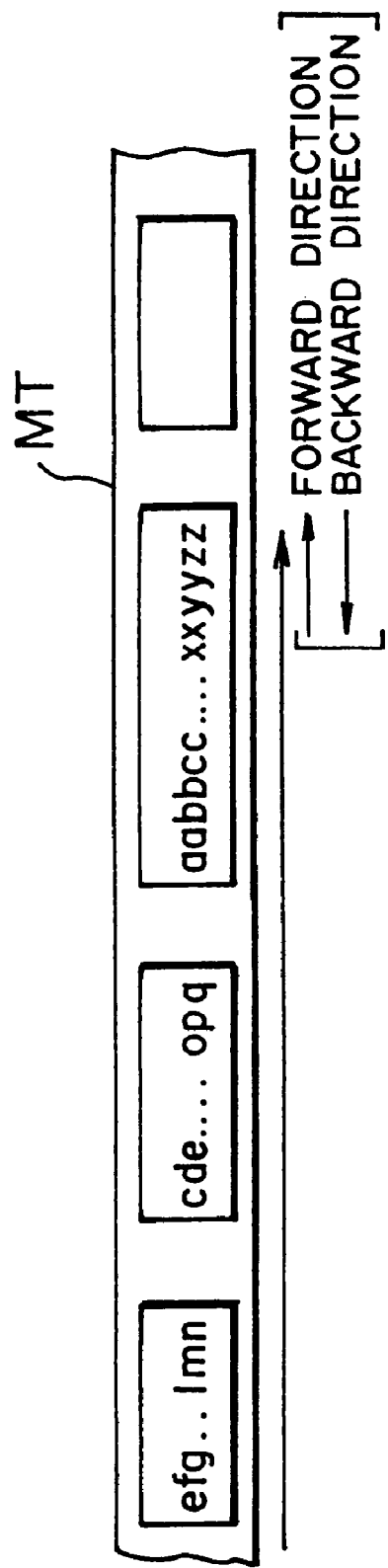
FIG. 4 is a diagram for explaining a mechanical operation (forward reading) of the magnetic tape unit after a predetermined condition is met in the method of controlling the magnetic tape unit according to the embodiment of the present invention.

At the time, as shown by the arrow in FIG. 4, the MTU 30 is mechanically operated such that the head of the MTU 30 is moved by the three data blocks in the forward direction relative to the magnetic tape MT. In this case, as shown in FIG. 5, the three data blocks are sequentially read as "efg . . . lmn" "cde . . . opq," and "aabbcc . . . xxyyzz," and are written in the data buffer 17 to overwrite the data blocks "zzyyxx . . . ccbbaa," "qpo . . . edc," and "nml . . . gfe" which have been read in the backward direction.

Figure 5:
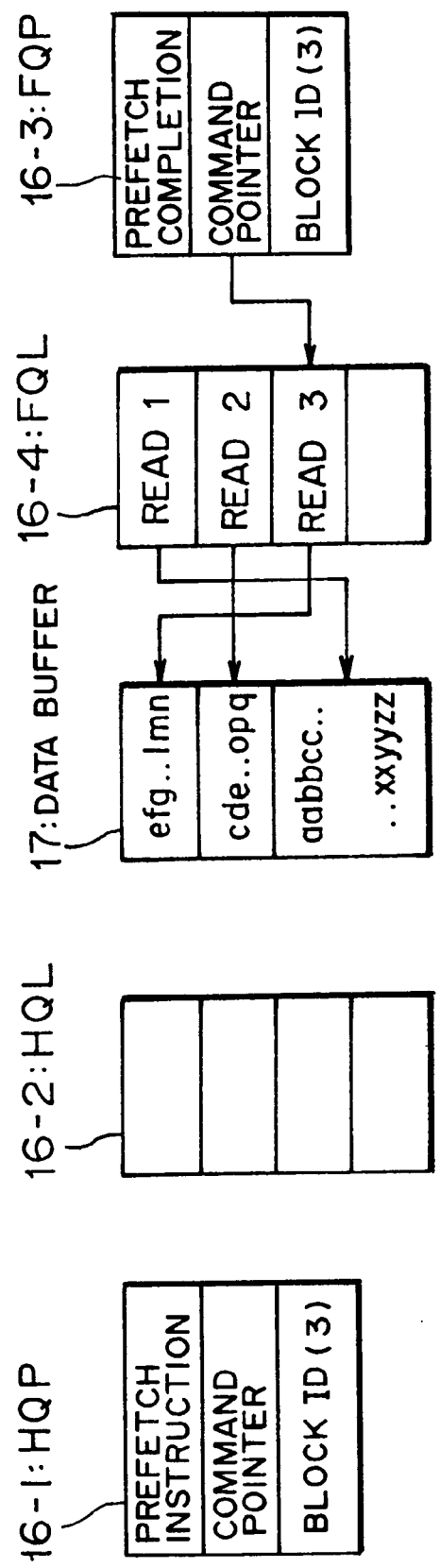
FIG. 5 is a diagram showing data and commands respectively read in the data buffer and the command buffer by the forward reading in the method of controlling the magnetic tape unit according to the embodiment of the present invention.

In such a manner, the data blocks read in the forward direction are written in the data buffer 17, and read commands "READ 1," "READ 2," and "READ 3" concerning the data blocks read in the forward direction overwrite commands "READBACK" as shown in FIG. 5. The read commands are thereby stored in the command queue of the FQL 16-4 in reverse order (see the arrows in FIG. 5) to how the data blocks are read by the MTU 30 (see Step S5 in FIG. 1). Thereafter, the latest command pointer and the latest block ID are stored in the FQP 16-3, and the prefetch completion flag is set.

The assumption is made that "3" is set as the latest block ID. In the illustration shown in FIG. 5, it is defined that the first data block "efg . . . lmn" read by the forward reading of the MTU 30 has an ID of "1," the next read data block "cde . . . opq" has an ID of "2," and the finally read data block "aabbcc . . . xxyyzz" has an ID of "3."

When the prefetch completion flag is set in the FQP 16-3, as in the prior art, the MTC 10 sends to the CPU 20 as a UCK (Unit ChecK) a retry request for a read command shown by ERP (Error Recovery Procedure)=26. In response thereto, the CPU 20 issues the read command.

In the MTC 10, when the read command issued from the CPU 20 is received through the channel interface circuit 11, the HIC 14 compares a value of a command pointer of the HQP 16-1 with a value of the command pointer of the FQP 16-3, and refers to the corresponding FQL 16-4 so as to transfer to the CPU 20 the contents (the data block "aabbcc . . . xxyyzz") of the data buffer 17 instructed by the FQL 16-4 after expansion of the contents in the data expanding circuit 13 (see Step S6 in FIG. 1).

Figure 6:
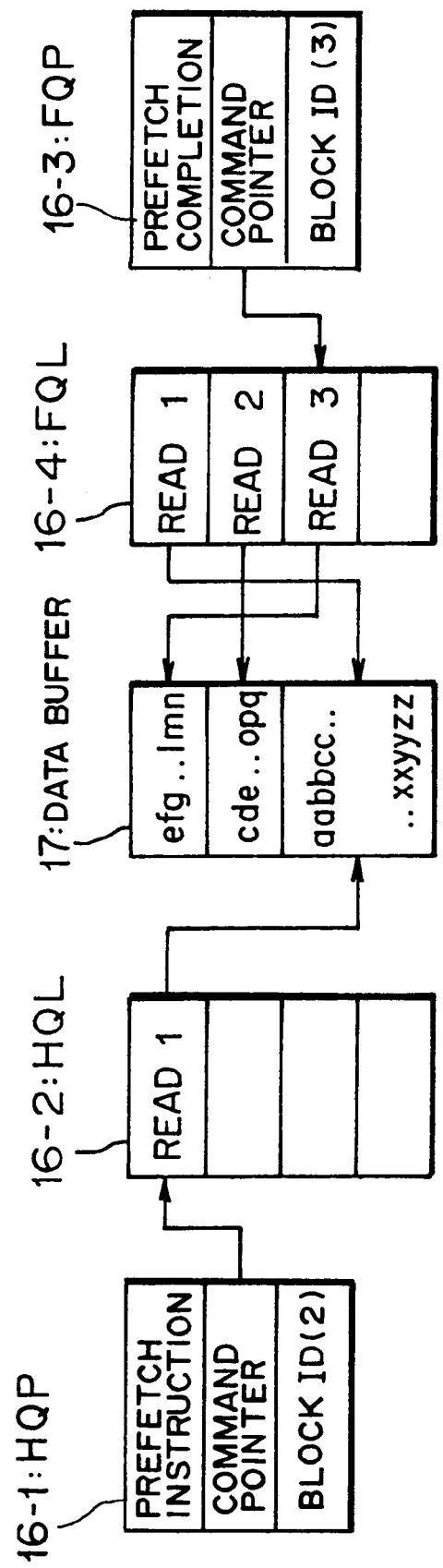
FIG. 6 is a diagram showing states of the data buffer and the command buffer, illustrating a data transfer operation in the embodiment.

As shown in FIG. 6, the HQP 16-1 and an HQL 16-2 are updated by the transfer, and the command "READ 1" which has been executed is recorded in the HQL 16-2. In this case, it is enough to simply transfer the data in the data buffer 17 without a mechanical operation (real reading) of the MTU 30.

Though the CPU 20 subsequently issues a backspace command, as shown in FIG. 6, the HIC 14 of the MTC 10 simply subtracts 1 from a value of a block ID pointer in response to the backspace command, and does not instruct the FMT 15 to actuate the MTU 30. Thus, in the embodiment, the MTU 30 is not mechanically operated in response to the backspace command.

Figure 9:
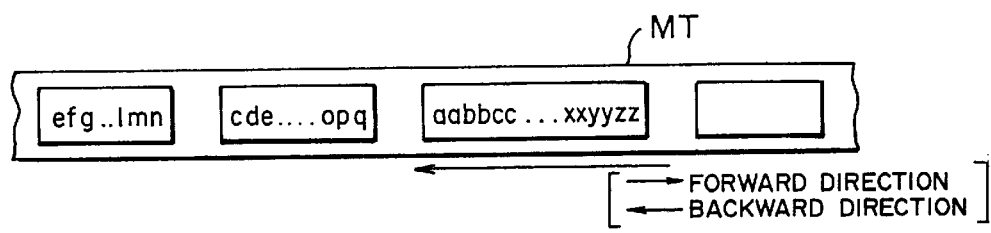
FIG. 9 is a diagram for explaining an image of the operation of the magnetic tape unit viewed from a host processor when the host processor issues a backspace command at a time of the data transfer operation in the embodiment.

However, 1 is subtracted from the value of the block ID pointer ("2" being obtained by subtracting 1 from the value of the block ID pointer of the HQP 16-1 in the illustration shown in FIG. 6). The CPU 20 can recognize that a head position of the MTU 30 has been moved (backspaced) by one data block in the backward direction relative to the magnetic tape MT as shown in FIG. 9.

Thereafter, when the CPU 20 continuously issues the read back commands, data in the data buffer 17 is repeatedly read as long as the data buffer 17 has any data as in the above discussion.

Figure 7:
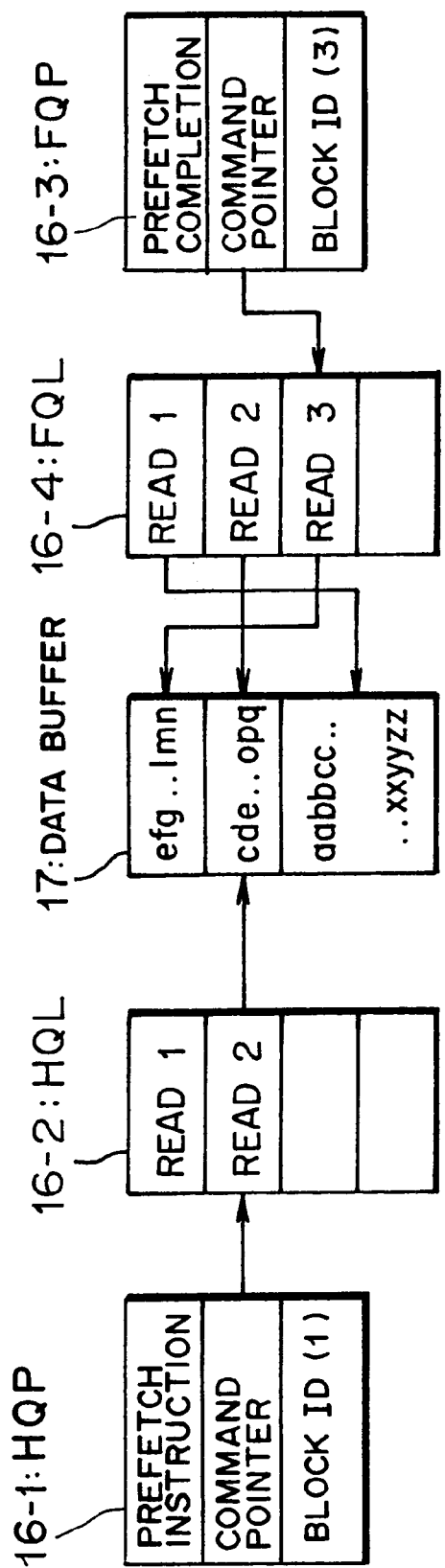
FIGS. 7 and 8 are diagrams showing states of the data buffer and the command buffer, illustrating the data transfer operation in the embodiment.

That is, in a state shown in FIG. 6, when the MTC 10 receives the next read back command, the HIC 14 transfers to the CPU 20 the contents (the data block "cde . . . opq") of the data buffer 17 instructed by the FQL 16-4 after the expansion of the contents in the data expanding circuit 13. As shown in FIG. 7, the HQP 16-1 and the HQL 16-2 are updated by the transfer, and the command "READ 2" which has been executed is recorded in the HQL 16-2. Subsequently, in response to the backspace command, the HIC 14 of the MTC 10 subtracts 1 from the value of the block ID pointer, resulting in "1."

Figure 8:
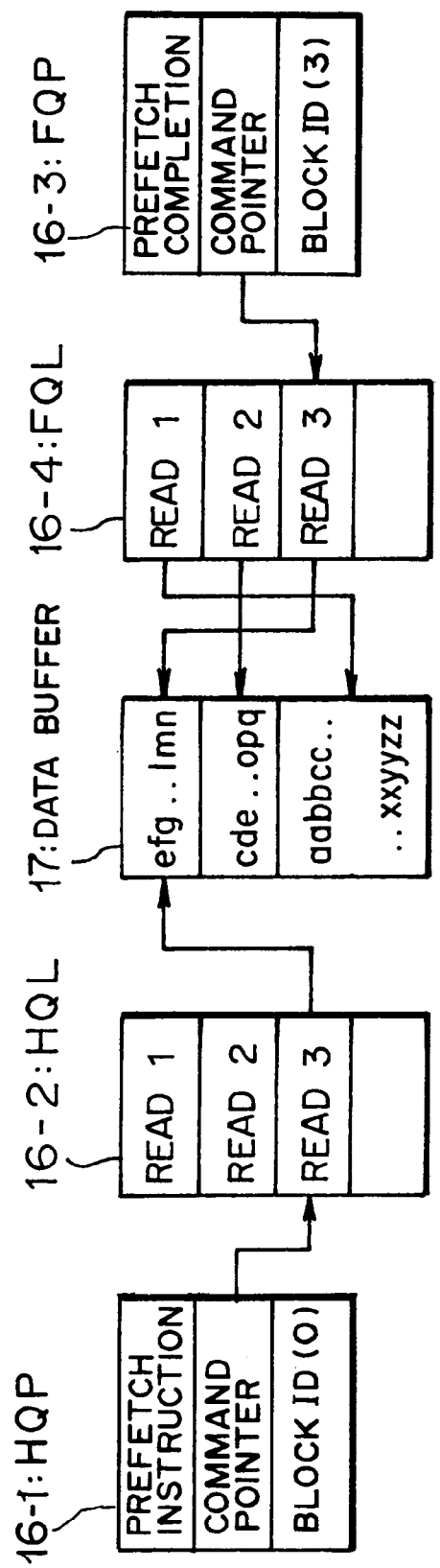

Further, in a state shown in FIG. 7, when the MTC 10 receives the next read back command, the HIC 14 transfers to the CPU 20 the contents (the data block "efg . . . lmn") of the data buffer 17 instructed by the FQL 16-4 after the expansion of the contents in the data expanding circuit 13. As shown in FIG. 8, the HQP 16-1 and the HQL 16-2 are updated by the transfer, and the command "READ 3" which has been executed is recorded in the HQL 16-2. Subsequently, in response to the backspace command, the HIC 14 of the MTC 10 subtracts 1 from the value of the block ID pointer, resulting in "0."

As discussed above, in the embodiment, the data blocks can be stored in the data buffer 17 with the data arranged in the forward direction, and the read commands are arranged in the FQL 16-4 in reverse order. Hence, the HIC 14 can easily fetch the plurality of data blocks from the data buffer 17 in the order directed backward so as to sequentially transfer the data blocks to the CPU 20.

Figure 10:
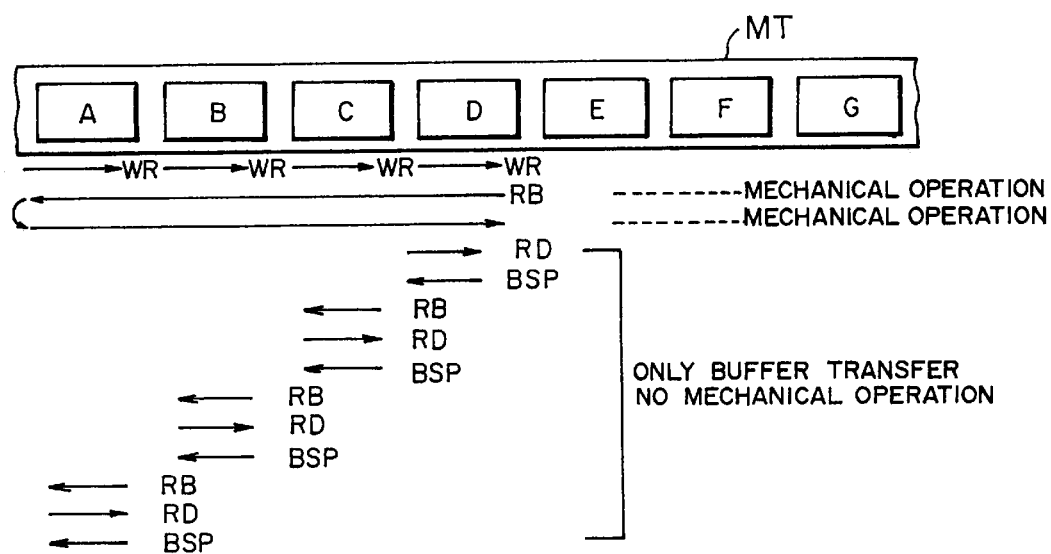
FIG. 10 specifically illustrates a case where ROR processing are continuously performed after continuous writing according to the method of the embodiment.

FIG. 10 specifically illustrates a case where the ROR processing are continuously performed after continuous writing according to the method of the embodiment. In the illustration shown in FIG. 10, in response to a write command (WR) from the CPU 20, the MTU 30 continuously writes data blocks A, B, C, and D on the magnetic tape MT, and subsequently the CPU 20 continuously issues read back commands (RB).

In response to the first read back command, the MTC 10 first causes the MTU 30 to read the range from the data block D to the data block A in the backward direction, and read the range from the data block A to the data block D in the forward direction. The result of reading is written in the data buffer 17 or a command buffer 16 as described above referring to FIG. 5.

Further, the data block D in the data buffer 17 is transferred to the CPU 20 in response to the read command from the CPU 20. However, the MTU 30 is not mechanically operated in response to the read command (RD) and the backspace command (BSP) from the CPU 20.

In the ROR processing with respect to the second and later read back commands, the MTC 10 transfers the data in the read data buffer 17 as long as the data buffer 17 has any data, but does not cause the MTU 30 to mechanically operate.

Figure 29:
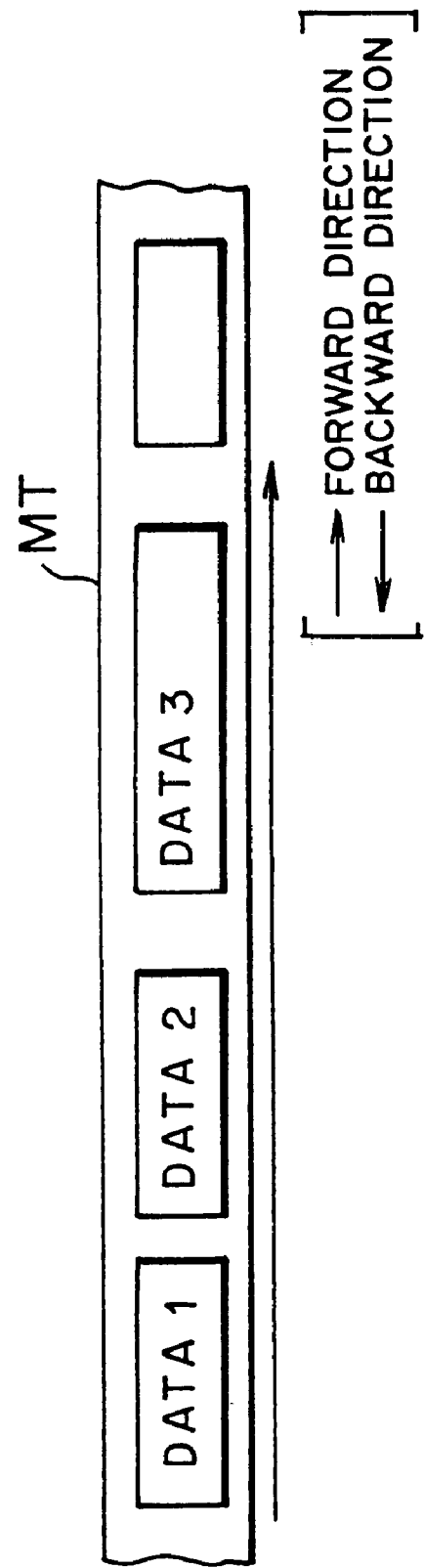
FIG. 29 is a diagram for explaining a mechanical operation of a magnetic tape unit at a time of reading.
Figure 30:
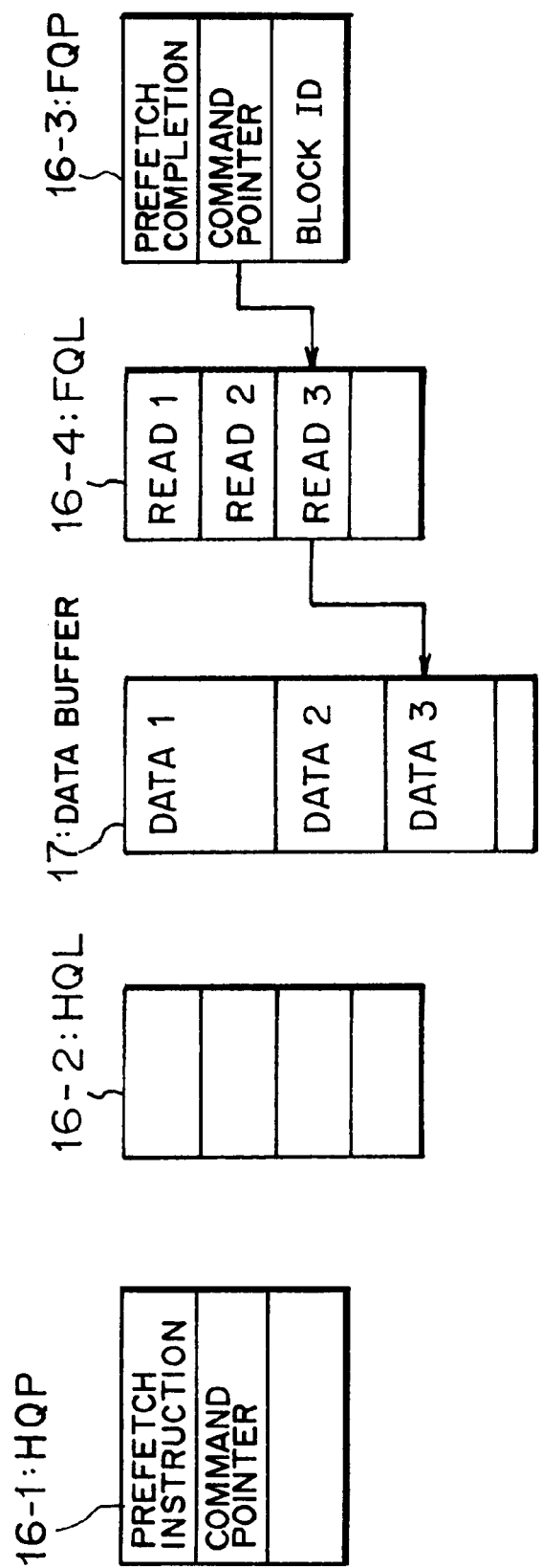
FIG. 30 is a diagram showing data and commands respectively read in the data buffer and the command buffer by the reading.
Figure 31:
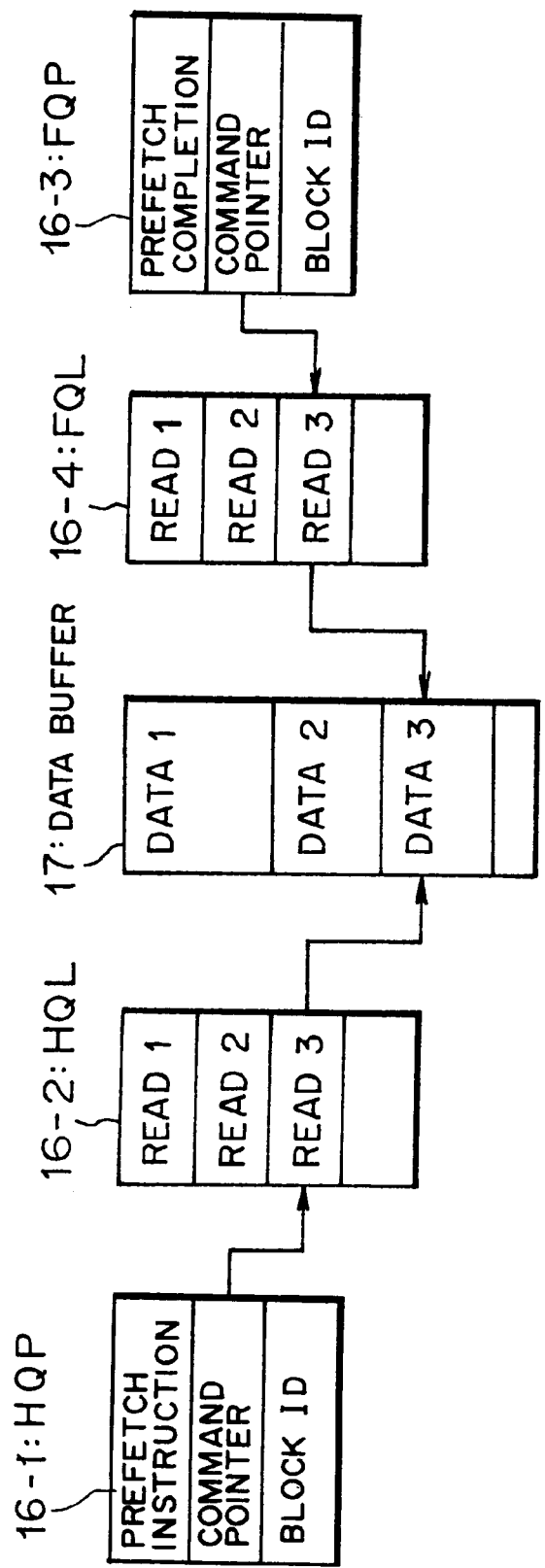
FIG. 31 is a diagram showing states of the data buffer and the command buffer, illustrating a transfer operation of read data to a host processor.
Figure 32:
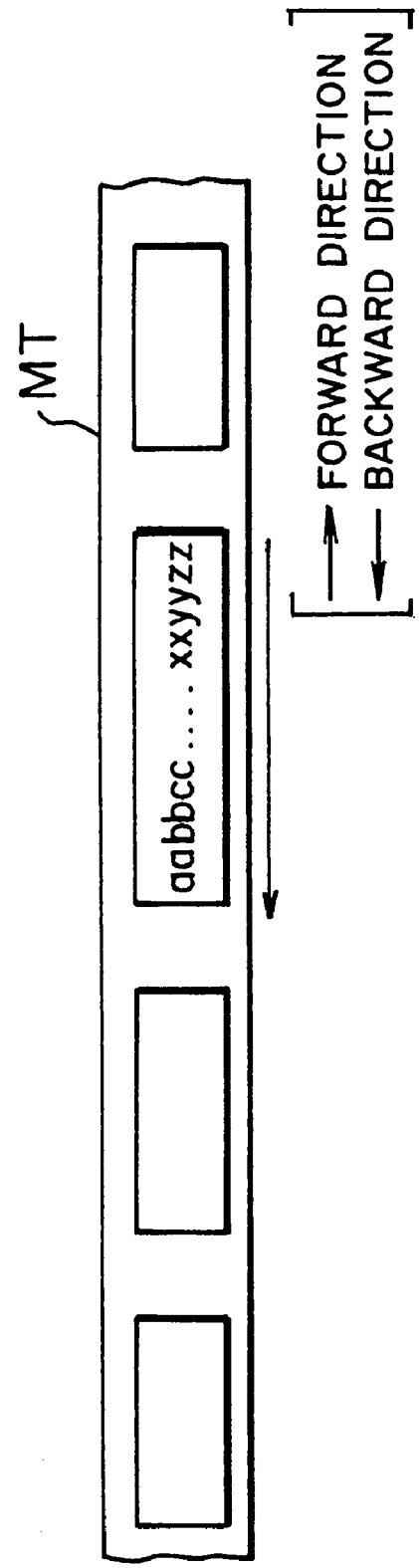
FIG. 32 is a diagram for explaining a mechanical operation (backward reading) of the conventional magnetic tape unit when a read back command is received.
Figure 33:
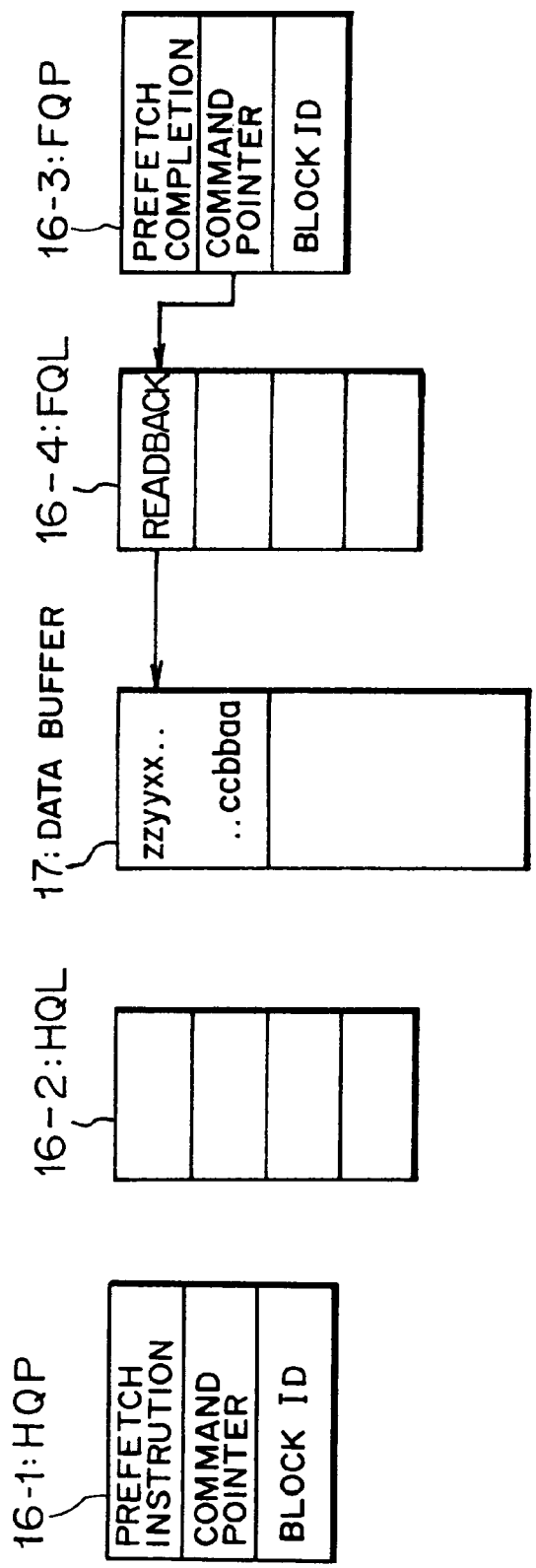
FIG. 33 is a diagram showing data and commands respectively read in the data buffer and the command buffer by the backward reading.
Figure 34:
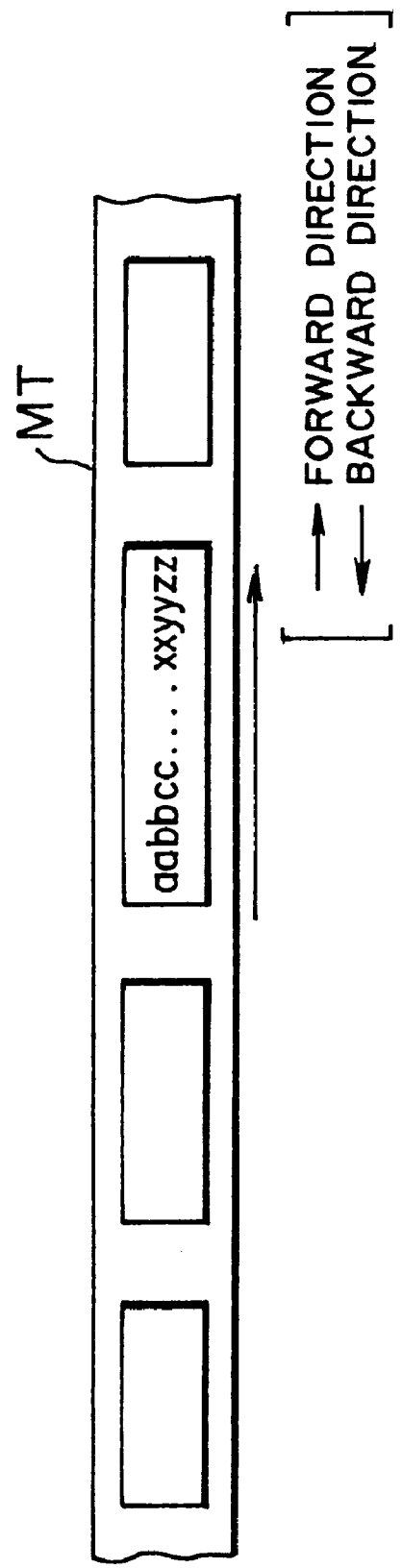
FIG. 34 is a diagram for explaining a mechanical operation (forward reading) of the magnetic tape unit after the backward reading, illustrating conventional ROR processing.
Figure 35:
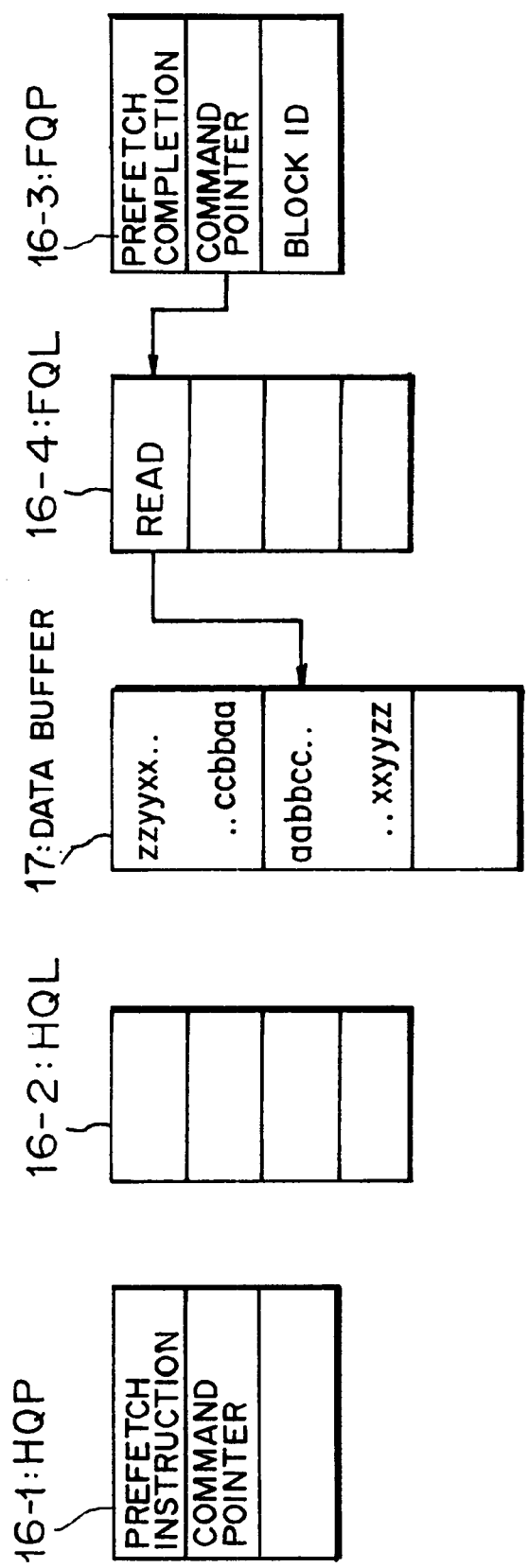
FIG. 35 is a diagram showing data and commands respectively read in the data buffer and the command buffer by the forward reading, illustrating conventional ROR processing.
Figure 36:
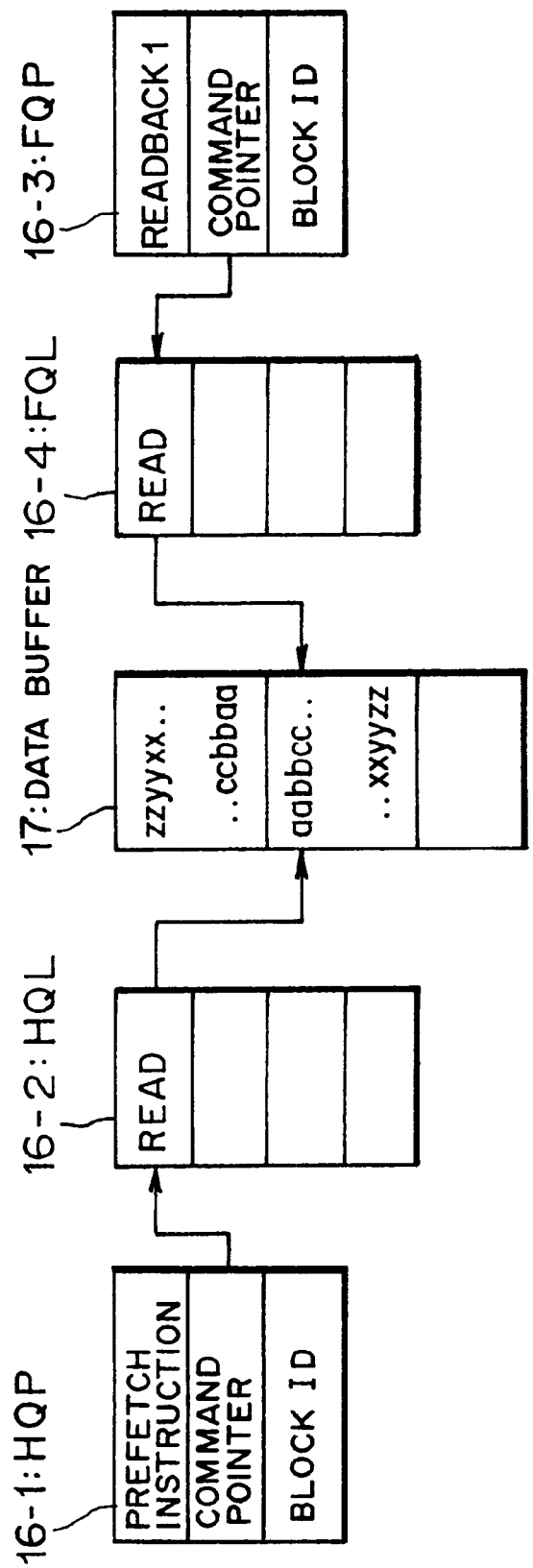
FIG. 36 is a diagram showing states of the data buffer and the command buffer, illustrating a transfer operation of read data to a host processor in the conventional ROR processing.
Figure 37:
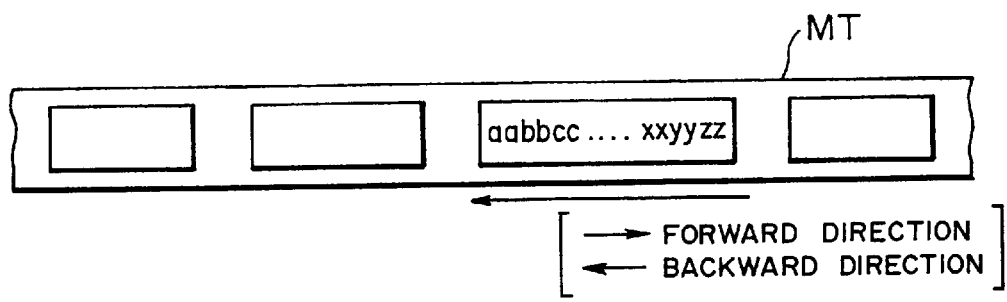
FIG. 37 is a diagram for explaining a mechanical operation of the magnetic tape unit when the host processor issues a backspace command during the conventional ROR processing.
Figure 38:
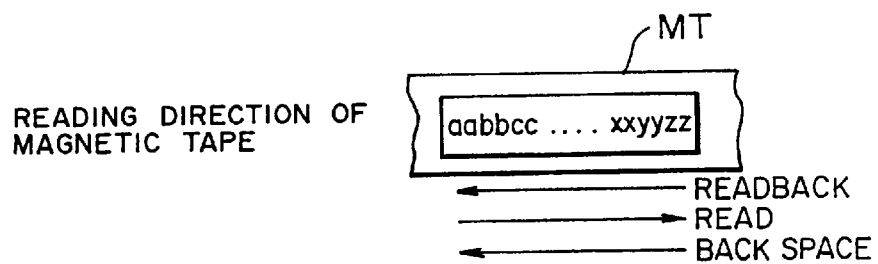
FIG. 38 is a diagram showing all mechanical operations of the magnetic tape unit for a time interval from the issue of the read back command to the completion of the conventional ROR processing.

Next, referring to FIGS. 11 to 13, a description will be given of ROR processing in a case where the read back command issued from the CPU 20 is received in the MTC 10 through the channel interface circuit 11 after the continuous reading according to the procedure described above referring to FIGS. 29 to 31.

Figure 11:
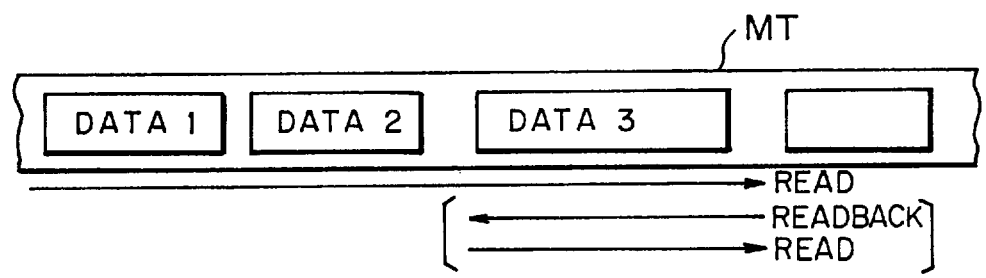
FIG. 11 is a diagram for explaining the operation when the read back command is received after the reading in the method of the embodiment.
Figure 12:
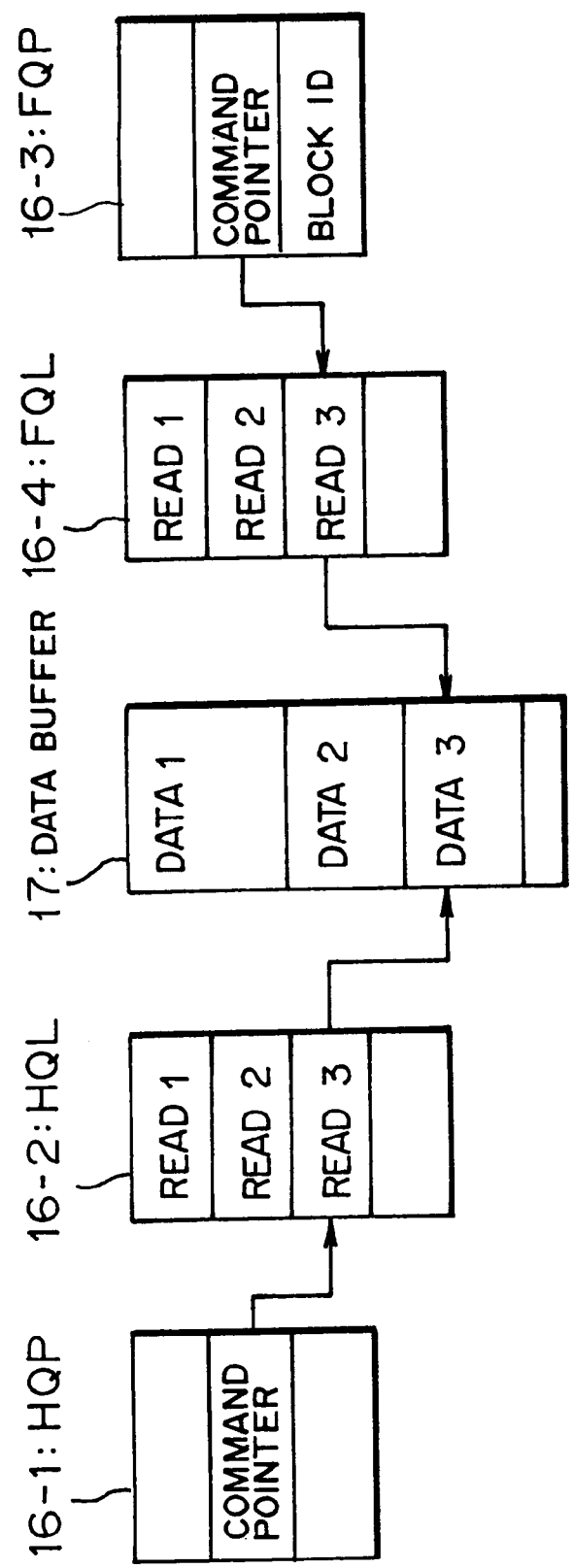
FIG. 12 is a diagram showing states of the data buffer and the command buffer after the reading.

As shown in FIG. 11, the MTU 30 sequentially reads the data blocks "DATA 1," "DATA 2," and "DATA 3" in the forward direction. Subsequently, in response to a read back command from the CPU 20, the HIC 14 does not perform the ROR processing as described above referring to FIGS. 1 to 10 with respect to the preceding data block "DATA 3," but reads the data block "DATA 3" written in the data buffer 17 to transfer the data block to the CPU 20 after the data expansion as shown in FIG. 12. Thus, the mechanical operation of the MTU 30 is not required in this case.

Figure 13:
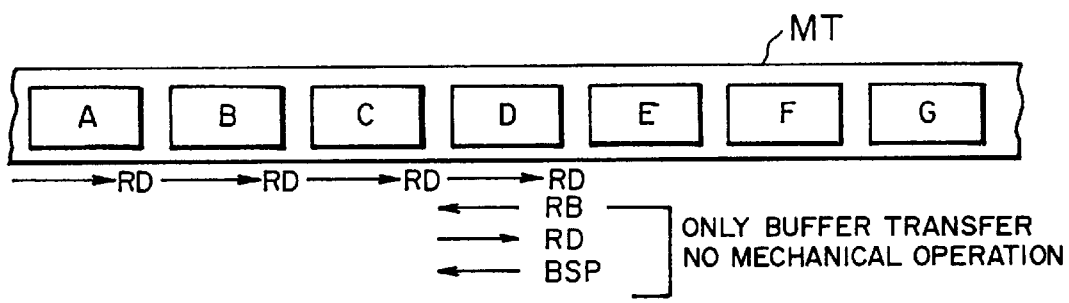
FIG. 13 specifically illustrates a case where the ROR processing is performed after continuous reading according to the method of the embodiment.

FIG. 13 illustrates a case where the ROR processing is performed after the continuous reading according to the method of the embodiment. In the case shown in FIG. 13, in response to a read command (RD) from the CPU 20, the MTU 30 continuously reads the data blocks A, B, C, and D from the magnetic tape MT, and subsequently the CPU 20 issues a read back command (RB).

In response to the read back command, the MTC 10 reads the preceding data block D from the data buffer 17 to transfer the data block to the CPU 20 after the data expansion without the mechanical operation (real reading) of the MTU 30. Thus, only the transfer from the buffer is performed, and the MTU 30 is not mechanically operated in response to the read back command, the read command, and the backspace command.

A description will now be given of conditions (predetermined conditions: criteria in Step S3 of FIG. 1) (1) to (9) for switching from the backward direction to the forward direction referring to FIGS. 14 to 20. Moreover, in the drawings, the arrows show the mechanical operation of the MTU 30.

Figure 14:
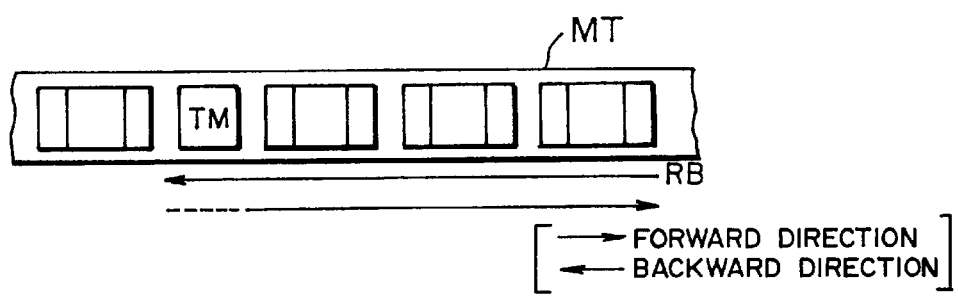
FIG. 14 is a diagram for explaining a predetermined condition (a condition for switching from the backward direction to the forward direction; detection of a tape mark) in the embodiment.

(1) As shown in FIG. 14, a tape mark (special block) "TM" to identify a file boundary is recorded between files on the magnetic tape MT. The process is switched over from the backward direction to the forward direction depending upon timing of detection of the tape mark "TM."

Figure 15:
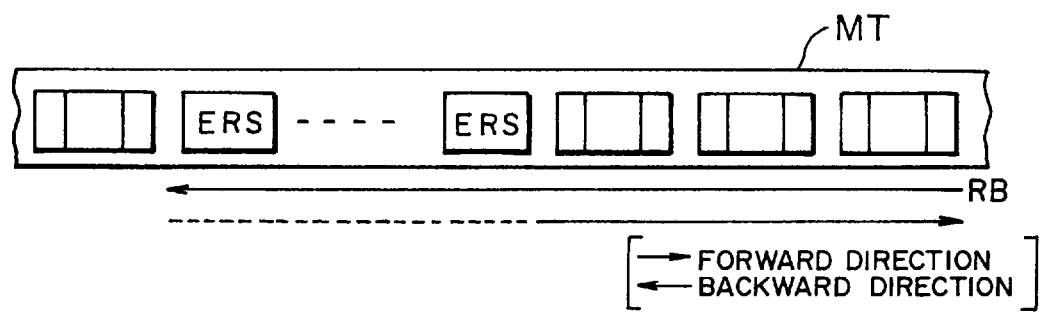
FIG. 15 is a diagram for explaining a predetermined condition (a condition for switching from the backward direction to the forward direction; detection of an erase mark) in the embodiment.

(2) As shown in FIG. 15, when the previously written data block is erased and nullified on the magnetic tape MT, an erase mark (special block) "ERS" to erase a data block overwrites the data block. The process is switched over from the backward direction to the forward direction depending upon timing of detection of the erase mark "ERS."

Figure 16:
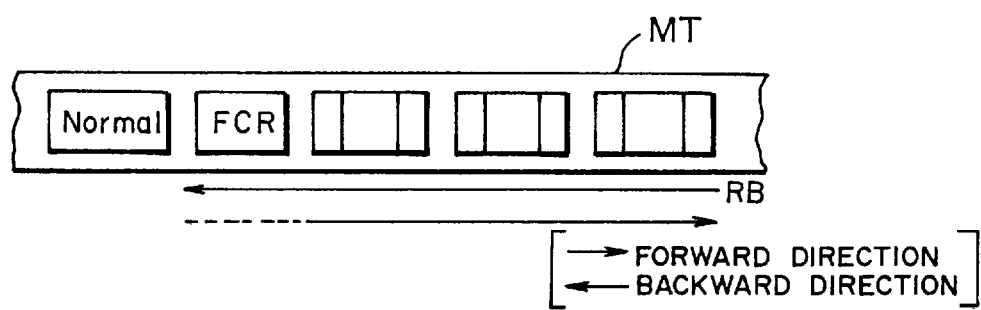
FIG. 16 is a diagram for explaining a predetermined condition (a condition for switching from the backward direction to the forward direction; detection of an FCR mark) in the embodiment.

(3) As shown in FIG. 16, a format change record mark (special block) "FCR" to identify a format change boundary is written on the magnetic tape MT at a portion where a format of the data block is changed, for example, between a compressed block and an uncompressed block (NORMAL BLOCK). The process is switched over from the backward direction to the forward direction depending upon timing of detection of the format change record mark "FCR."

Figure 17:
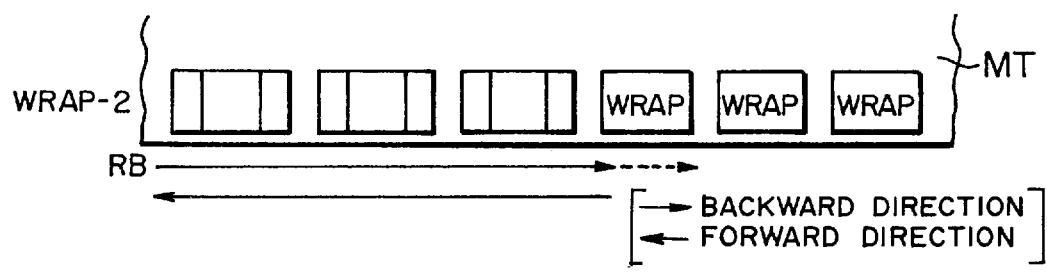
FIG. 17 is a diagram for explaining a predetermined condition (a condition for switching from the backward direction to the forward direction; detection of a wrap mark) in the embodiment.

(4) As shown in FIG. 17, when data is recorded on the magnetic tape MT in double density, a plurality of wrap marks "WRAP" are recorded at wrap positions of data writing/reading. The process is switched over from the backward direction to the forward direction depending upon timing of detection of the wrap mark "WRAP." Moreover, in FIG. 17, the arrow shows the mechanical operation of the MTU 30 when a read back command (RB) is received in a state in which the data writing is performed after the wrap-around at an end of the magnetic tape MT (that is, data is written on WRAP-2 of the magnetic tape MT).

Figure 18:
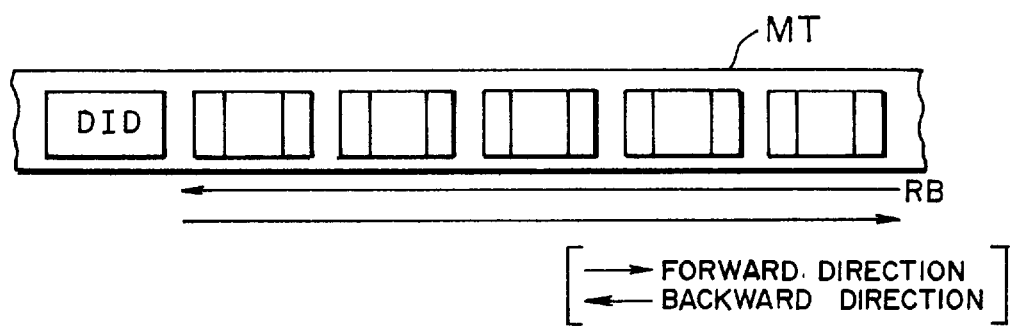
FIG. 18 is a diagram for explaining a predetermined condition (a condition for switching from the backward direction to the forward direction; detection of a DID mark) in the embodiment.

(5) As shown in FIG. 18, a DID (Density IDentification) mark "DID" to indicate a head is recorded at a head on the magnetic tape MT. The process is switched over from the backward direction to the forward direction depending upon timing of detection of the mark "DID." Moreover, the DID mark serves as a block having a block ID of "0," and as a VOL (volume header label, beginning-of-volume label).

Figure 19:
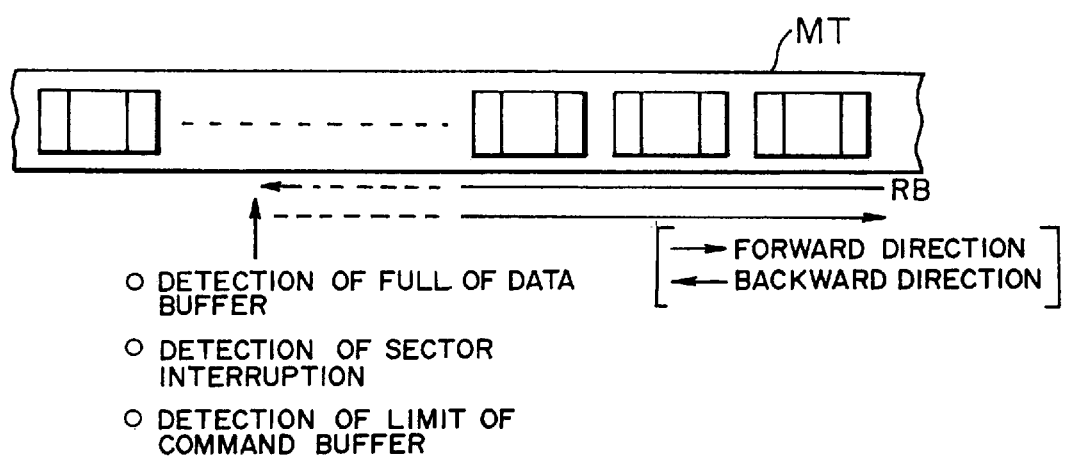
FIG. 19 is a diagram for explaining predetermined conditions (conditions for switching from the backward direction to the forward direction; detection of a full state of the data buffer, detection of a sector interruption, and detection of a limit of the command buffer) in the embodiment.

(6) As shown in FIG. 19, the process is switched over from the backward direction to the forward direction depending upon timing of detection of a full state of a data buffer 17.

(7) As shown in FIG. 19, the process is switched over from the backward direction to the forward direction depending upon timing of detection of a sector interruption from the MTU 30.

(8) As shown in FIG. 19, the process is switched over from the backward direction to the forward direction depending upon timing of detection of a limit of the command queue in the FQL 16-4 of the command buffer 16.

Figure 20:
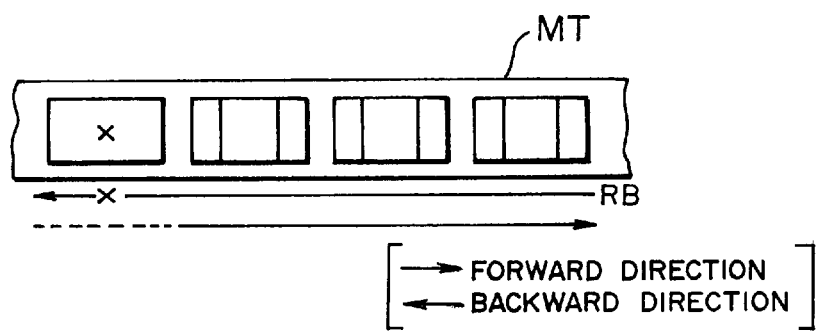
FIG. 20 is a diagram for explaining a predetermined condition (a condition for switching from the backward direction to the forward direction; detection of a data check signal) in the embodiment.

(9) As shown in FIG. 20, when there is an unreadable data block (shown by reference mark x in FIG. 20) which cannot be read in the data buffer 17 at the time of the backward reading, a data check signal is generated with respect to the unreadable data block. The process is switched over from the backward direction to the forward direction depending upon timing of detection of the data check signal.

Figure 21:
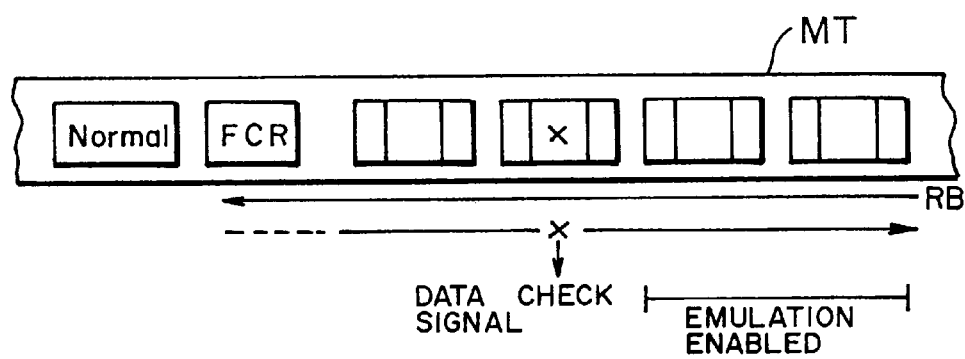
FIG. 21 is a diagram for explaining a range in which emulation is enabled when the data check signal is detected during the forward reading in the embodiment.

On the other hand, in the embodiment, as shown in FIG. 21, after a plurality of data blocks are read in the backward direction to be written in the data buffer 17, the data check signal to the unreadable data block may be detected before the plurality of data blocks are read in the forward direction up to an original head position (start position of the read back command) in the forward direction (normal reading direction). In this case, emulation is enabled to data blocks read on the side of the start position of the read back command with respect to the unreadable data block (shown by reference mark x in FIG. 21), and the data blocks are transferred to the CPU 20.

Figure 22:
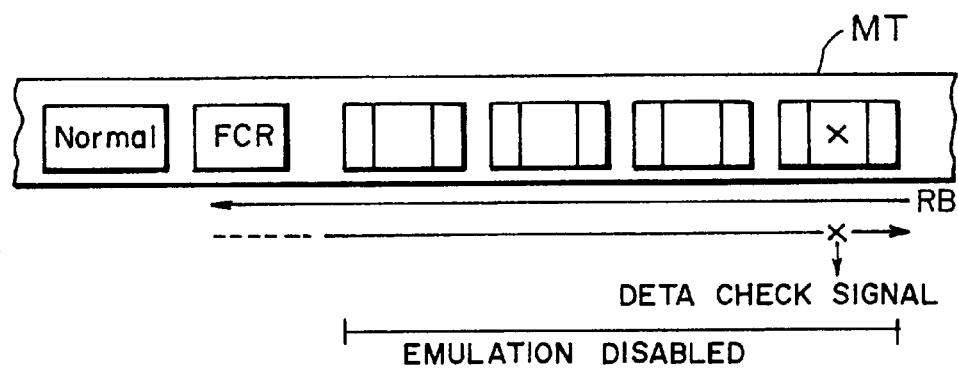
FIG. 22 is a diagram for explaining a range in which emulation is disabled when a data check signal to the last data block is detected during the forward reading in the embodiment.

As shown in FIG. 22, if the unreadable data block is a data block (last data block) at the start position of the read back command, and a data check signal to the last data block is detected, the emulation is disabled to all data blocks read in the forward direction from a position at which the process is switched over from the backward direction to the forward direction, and no data is transferred to the CPU 20. Moreover, FIGS. 21 and 22 illustrate a case where the process wraps around at the FCR mark.

Figure 23:
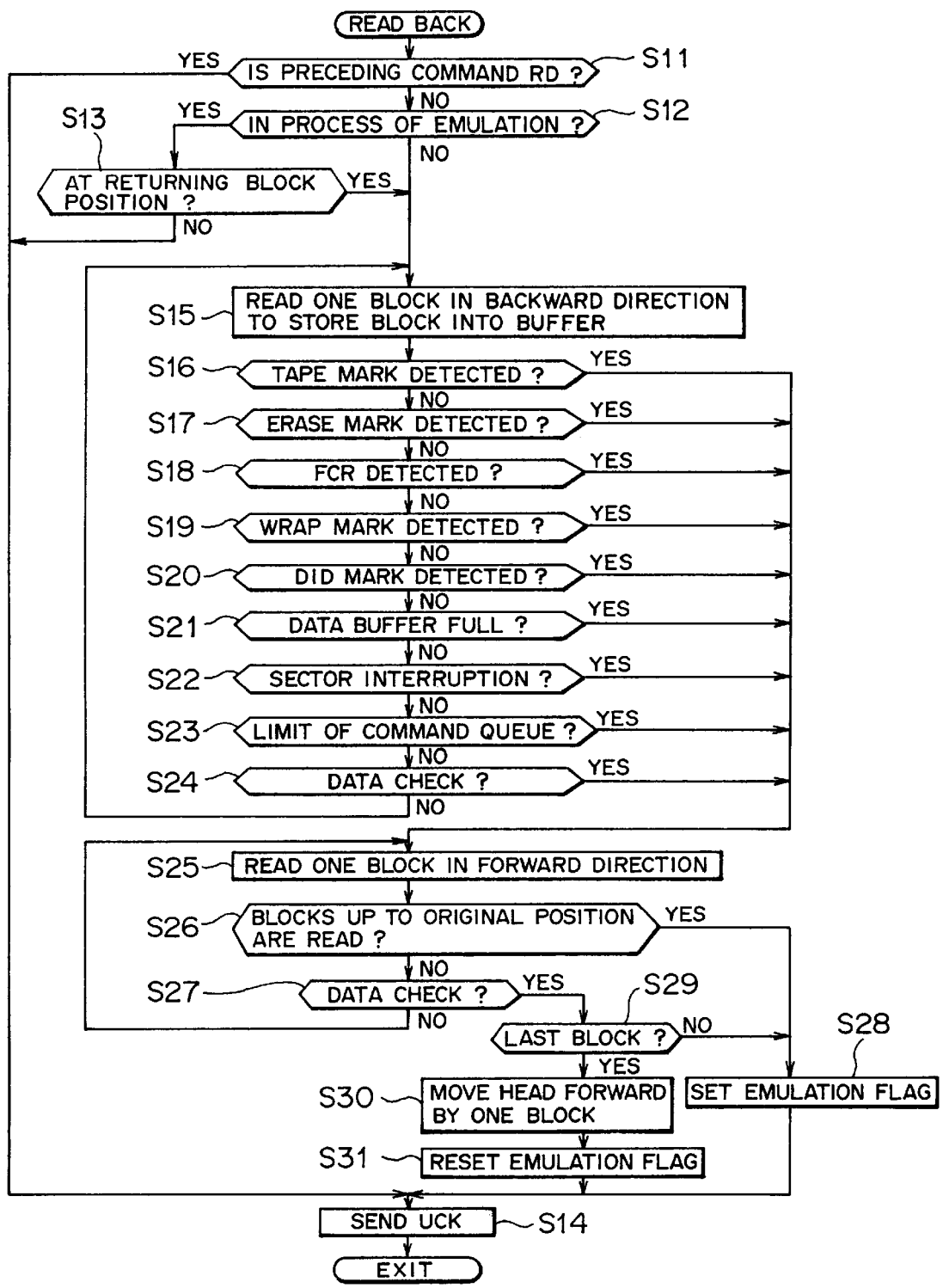
FIG. 23 is a flowchart for explaining a specific operation when the read back command from the host processor is received in a magnetic tape controller to which the method of the embodiment is applied.

Next, in view of the above-mentioned characteristic operation of the present invention, a description will be given of a specific operation when the read back command from the CPU 20 is received in the MTC 10 of the embodiment referring to the flowchart (Steps S11 to S31) shown in FIG. 23.

When the read back command from the CPU 20 is received in the MTC 10, it is first decided whether or not the preceding command is a read command (RD) (Step S11). In the case of the read command (YES in Step S11), the MTC 10 sends the UCK to the CPU 20 without the mechanical operation of the MTU 30 (Step S14).

If the preceding command is not the read command, that is, in the case of a write command (NO in Step S11), it is decided whether or not the operation is in the process of emulation, that is, whether or not data is being read in the data buffer 17 in response to the read back command (Step S12).

If in the process of emulation (YES in Step S12), it is decided whether or not the head of the MTU 30 reaches a returning block position of the magnetic tape (Step S13). If the head does not reach the returning block position (NO in Step S13), the process proceeds to Step S14 where the MTC 10 sends the UCK to the CPU 20.

If not in the process of emulation (NO in Step S12), or if the operation is in the process of emulation and the head of the MTU 30 reaches the returning block position of the magnetic tape (if data are further continuously read in the backward direction), the MTC 10 first causes the MTU 30 to read one data block in the backward direction, thereby storing the data block in the data buffer 17 (Step S15).

Further, in the MTC 10, it is decided in the process from Steps S16 to S24 whether or not the conditions for switching from the backward direction to the forward direction are met. That is, the process proceeds to decide whether or not the tape mark is detected (Step S16), whether or not the erase mark is detected (Step S17), whether or not the FCR is detected (Step S18), whether or not the wrap mark is detected (Step S19), whether or not the DID mark is detected (Step S20), whether or not the full state of the data buffer 17 is detected (Step S21), whether or not the sector interruption is detected (Step S22), whether or not the limit of the command queue is detected (Step S23), and whether or not the data check signal is detected (Step S24). If none of them is detected (if decisions of NO are obtained in Steps S16 to S24), the process returns to Step S15 where the MTC 10 causes the MTU 30 to read one data block in the backward direction, thereby storing the data block in the data buffer 17.

The backward reading in Step S15 is stopped when a decision of YES is obtained in any one of Steps S16 to S24, and the process proceeds to Step S25. That is, when at least one of criteria in Steps S16 to S24 can be met, the process is switched over from the backward direction to the forward direction, and the MTC 10 causes the MTU 30 to read one data block in the forward direction, thereby storing the data block in the data buffer 17.

Further, the MTC 10 decides whether or not all data blocks are read up to the original position (the start position of the read back command) (Step S26), and whether or not the data check signal to the unreadable data block is detected (Step S27).

When all the data blocks have not yet read up to the original position (NO in Step S26), and no data check signal is detected (No in Step S27), the process returns to Step S25 where the MTC 10 causes the MTU 30 to read one data block in the forward direction, thereby storing the data block in the data buffer 17.

The forward reading in Step S25 is repeatedly performed until the data block at the original position is read, or until any data check signal is detected.

When the data blocks have been read up to the original position (YES in Step S26), the MTC 10 sets an emulation flag (Step S28), and subsequently sends the UCK to the CPU 20 (Step S14).

Further, when any data check signal is detected (YES in Step S27), the MTC 10 decides whether or not an unreadable data block by which the data check signal is generated is the last data block (Step S29).

In the case of the last data block (YES in Step S29), the head of the MTU 30 is moved by one data block in the forward direction with respect to the magnetic tape to reach the start position of the read back command (Step S30). Subsequently, the emulation flag is reset (Step S31), and the emulation to the current read back command is disabled. Then, the MTC 10 sends the UCK to the CPU 20 (Step S14).

When it is decided that the unreadable data block is not the last data block in Step S29 (decision of NO), the emulation flag is set (Step S28) to enable the emulation to data blocks in the forward direction with respect to the unreadable data block by which the data check signal is generated. Then, the MTC 10 sends the UCK to the CPU 20 (Step S14).

Figure 24:
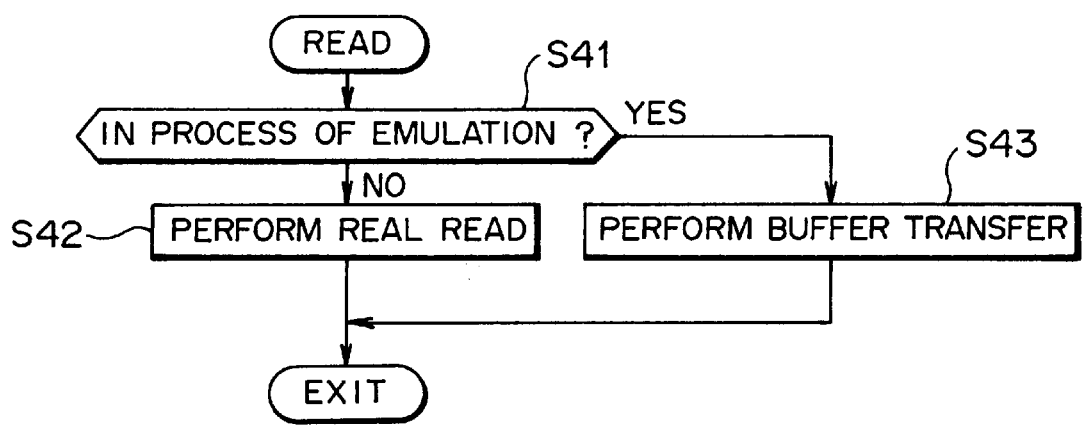
FIG. 24 is a flowchart for explaining a specific operation when the read command from the host processor is received in the magnetic tape controller to which the method of the embodiment is applied.

A description will now be given of a specific operation when the read command from the CPU 20 is received in the MTC 10 of the embodiment referring to the flowchart (Steps S41 to S43) shown in FIG. 24.

When the read command from the CPU 20 is received in the MTC 10, it is first decided whether or not the operation is in the process of emulation (Step S41).

If not in the process of emulation (NO in Step S41), the MTC 10 causes the MTU 30 to perform reading (real read) with the mechanical operation in the forward direction (Step S42). Otherwise, if in the process of emulation (YES in Step S41), the MTC 10 transfers the data block in the data buffer 17 to the CPU 20 without the mechanical operation of the MTU 30 (Step S43).

Figure 25:
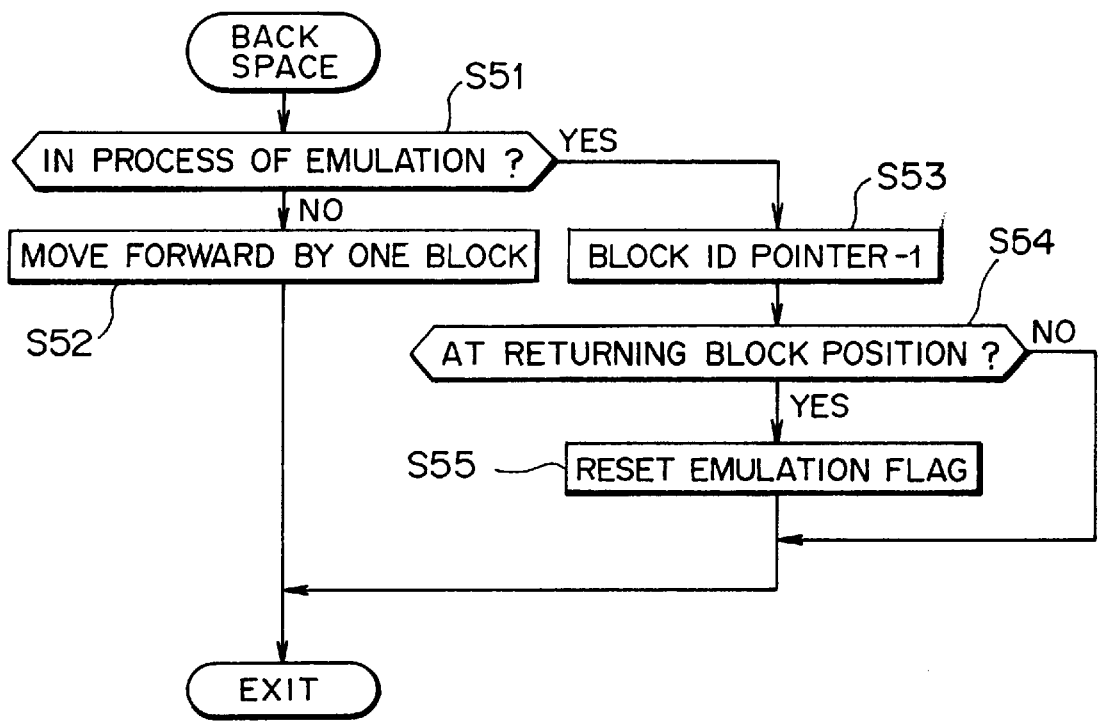
FIG. 25 is a flowchart for explaining a specific operation when the backspace command from the host processor is received in the magnetic tape controller to which the method of the embodiment is applied.

Further, a description will be given of a specific operation when the backspace command from the CPU 20 is received in the MTC 10 of the embodiment referring to the flowchart (Steps S51 to S55) shown in FIG. 25.

When the back space command from the CPU 20 is received in the MTC 10, it is first decided whether or not the operation is in the process of emulation (Step S51).

If not in the process of emulation (NO in Step S51), the MTC 10 causes the head of the MTU 30 to move in the forward direction by one data block with respect to the magnetic tape (Step S42).

On the other hand, if in the process of emulation (YES in Step S51), the MTC 10 subtracts 1 from the block ID pointer in the command buffer 16 so as to virtually move the head of the MTU 30 in the forward direction by one data block with respect to the magnetic tape (Step S53).

Subsequently, it is decided whether or not the head of the MTU 30 reaches the returning block position of the magnetic tape (Step S54). If not reach the returning block position (NO in Step S54), the MTC 10 terminates the process. Otherwise, if the head of the MTU 30 reaches the wrap block position of the magnetic tape, the MTC 10 resets the emulation flag (Step S55), thereafter terminating the process.

Next, referring to FIG. 26, a description will be given of a specific operation of the MTC 10 of the embodiment while making a comparison with an operation of an MTC to which a prior-art method is applied.

In the following discussion, a record on the magnetic tape includes the tape mark "TM" and an ordinary data block. The ordinary data block includes one physical block having two packets (logical blocks). Each packet holds EOF (End Of File) 1 data and EOF 2 data.

In FIG. 26, the "Command" column shows a command issued from the CPU 20 to the MTC 10, and reference numerals 1 to 21 are given to the commands in the order in which the commands are issued. In the "Command" column, the term "SNS" denotes a sense command issued by the CPU 20 in response to the UCK from the MTC 10. The remarks column shows information sent back to the CPU 20 from the MTC 10 in response to each command from the CPU 20.

Further, in FIG. 26, the numbered arrow shows movement of the head of the MTU 30 with the mechanical operation in response to the correspondingly numbered command. In addition, FIG. 26 shows a turnaround time (in milliseconds) required for processing according to each command from the CPU 20 in both a prior-art operation and the operation in the embodiment.

Processing numbered 1 to 8 show the operation when the read back command is received after the continuous writing as described referring to FIGS. 2 to 10. Conventionally, the ROR processing with the mechanical operation of the MTU 30 is performed for each packet (logical block). However, in the embodiment, backward reading and forward reading are continuously performed in response to a first read back command (RB numbered 1). Thereafter, data in the data buffer 17 is simply transferred without the mechanical operation of the MTU 30.

In the illustration shown in FIG. 26, a data check is made twice after the continuous writing. After the first data check is made in the processing numbered 1 to 8, reading is carried out in the processing numbered 9 to 12 to move the head of the MTU 30 back to a position in front of the data block.

Subsequently, in order to make the second data check, in the prior art, the ROR processing (numbered 13 to 20) with the mechanical operation of the MTU 30 is performed for each packet (logical block). Unlike the prior-art operation, in the embodiment, the above operation is equivalent to the procedure in which a read back command (RB; 13) is received after reading in response to a read command (RD) numbered 11. Thus, according to the method described above referring to FIGS. 11 to 13, in the processing numbered 13 to 20, only the data transfer is performed in the data buffer 17 without the mechanical operation of the MTU 30.

Finally, the MTC 10 disposes the head of the MTU 30 at a position behind the tape mark "TM" (i.e., a position where the read back is completed) in response to a read back command (RB) numbered 21, thereafter terminating a series of processing.

Figure 39:
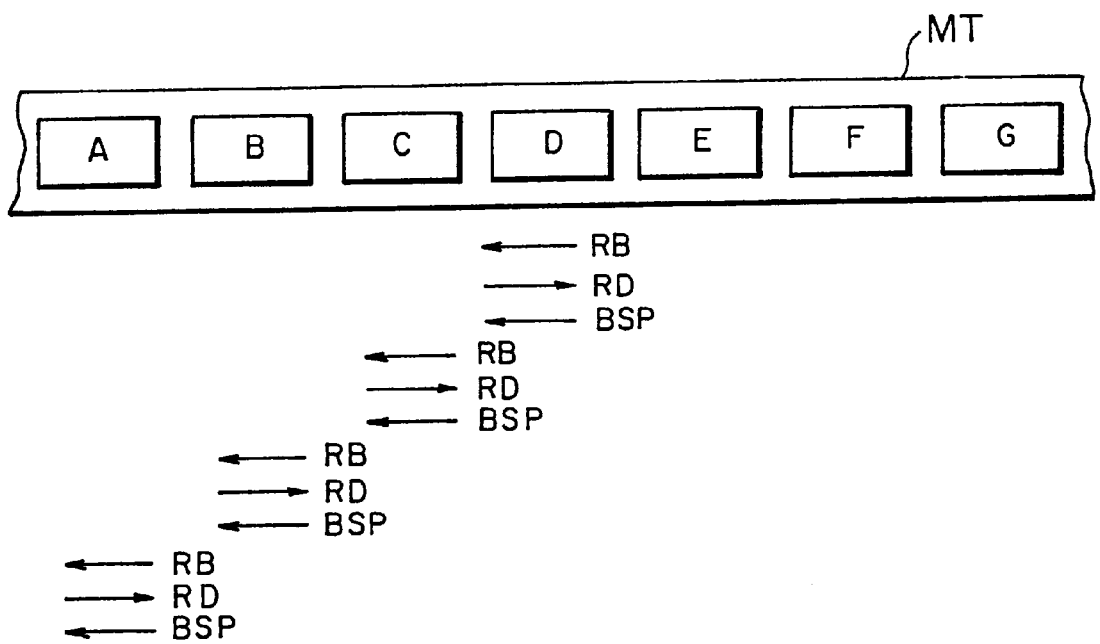
FIG. 39 is a diagram for explaining the mechanical operation of the magnetic tape unit when the conventional ROR processing are continuously performed.

That is, in the embodiment, the MTU 30 need not separately perform, for each data block, the piecemeal mechanical operation which is required in the prior art described referring to FIG. 39. Besides, after the data transfer in the data buffer 17, the head is operated to jump to a predetermined position (the position behind the tape mark "TM"). It is thereby possible to significantly reduce a processing time.

For example, when the data check is made twice after the continuous writing as described above, a total time of 1579.4 milliseconds is required according to the method of the embodiment while that of 4900.4 milliseconds is required in the prior-art method. This shows that the processing time can considerably be reduced.

As stated above, according to the method of controlling the MTU 30 in the embodiment of the present invention, after the continuous writing, the backward reading is continuously performed when the first read back command is issued. Thereafter, the process returns in the forward direction from the position at which the predetermined condition is met so as to continuously perform the reading.

Further, at the same time when the plurality of data blocks read in the forward direction are written in the data buffer 17, the read commands concerning the data blocks read in the forward direction are stored in the command queue of the FQL 16-4 in reverse order to how the data blocks are read. It is thereby possible to continuously transfer the data blocks in the data buffer 17 to the CPU 20 even when the read back commands are continuously issued as in the case of continuous processing of the read commands and the write commands.

Additionally, in the embodiment, when the read back command is received after the reading, the last data block is read from the data buffer 17 to be transferred to the CPU 20.

This completely eliminates the need for the mechanical operation of the MTU 30, required for each data block in the ROR processing, resulting in a considerably reduced processing time. Thus, without increasing the cost and the weight of the hardware, it is possible to remarkably enhance the performance of the ROR processing, that is, the performance of the MTC 10 only by modifying the firmware.

It is to be understood that the present invention should not be limited to the embodiment described above, and changes and variations may be made without departing from the spirit or scope of the following claims.

What is claimed is:

1. A method of controlling a magnetic tape unit, in which the magnetic tape unit is controlled in response to a command from a host processor, while temporarily storing into a data buffer a data block to be written onto a magnetic tape by the magnetic tape unit and a data block read from the magnetic tape by the magnetic tape unit, and storing into a command queue commands concerning the data blocks in the data buffer in the order in which the commands are executed, and the method comprising the steps of:

when a read back command to compressed data recorded on the magnetic tape is received from the host processor, causing the magnetic tape unit to read a plurality of data blocks in a backward direction from the magnetic tape;

when a read position of the magnetic tape unit reaches a position at which a predetermined condition is met, causing the magnetic tape unit to read in a forward direction from the magnetic tape the plurality of data blocks in the range between the position and a start position of the read back command so as to write the plurality of data blocks read in the forward direction into the data buffer;

storing read commands concerning the data blocks read in the forward direction into the command queue in reverse order to how the data blocks are read by the magnetic tape unit; and thereafter sequentially reading, in response to a read command from the host processor, the data blocks in the data buffer according to the read commands in the command queue so as to transfer the data blocks to the host processor after data expansion.

2. A method of controlling a magnetic tape unit according to claim 1, further comprising the step of:

when, in response to the read command from the host processor, compressed data recorded on the magnetic tape is read by the magnetic tape unit in the forward direction to be written into the data buffer, and subsequently a read back command to the compressed data is received from the host processor, reading the data block in the data buffer so as to transfer the data block to the host processor after data expansion.

3. A method of controlling a magnetic tape unit according to claim 1, wherein detection of a tape mark recorded on the magnetic tape to identify a file boundary is defined as the predetermined condition.

4. A method of controlling a magnetic tape unit according to claim 1, wherein detection of an erase mark recorded on the magnetic tape to erase a data block is defined as the predetermined condition.

5. A method of controlling a magnetic tape unit according to claim 1, wherein detection of a format change record mark recorded on the magnetic tape to identify a format change boundary is defined as the predetermined condition.

6. A method of controlling a magnetic tape unit according to claim 1, wherein detection of a wrap mark recorded on the magnetic tape to indicate a returning position at a time of double density recording is defined as the predetermined condition.

7. A method of controlling a magnetic tape unit according to claim 1, wherein detection of a mark recorded on the magnetic tape to indicate a head of the magnetic tape is defined as the predetermined condition.

8. A method of controlling a magnetic tape unit according to claim 1, wherein detection of a full state of the data buffer is defined as the predetermined condition.

9. A method of controlling a magnetic tape unit according to claim 1, wherein detection of a sector interruption from the magnetic tape unit side is defined as the predetermined condition.

10. A method of controlling a magnetic tape unit according to claim 1, wherein detection of a limit of the command queue is defined as the predetermined condition.

11. A method of controlling a magnetic tape unit according to claim 1, wherein detection of a data check signal to an unreadable data block is defined as the predetermined condition.

12. A method of controlling a magnetic tape unit according to claim 1, further comprising the step of:

when a data check signal to an unreadable data block is detected before the completion of forward reading of the plurality of data blocks in the range between the position at which the predetermined condition is met and the start position of the read back command, transferring to the host processor a data block read on the side of the start position of the read back command with respect to the unreadable data block.

13. A method of controlling a magnetic tape unit according to claim 12, further comprising the step of:

if the unreadable data block is a data block at the start position of the read back command, nullifying all the data blocks read in the forward direction from the position at which the predetermined condition is met.

* * * * *